(12) United States Patent
Moharana et al.

(10) Patent No.: US 12,205,388 B2
(45) Date of Patent: Jan. 21, 2025

(54) METHODS AND SYSTEMS FOR PERFORMING ON-DEVICE IMAGE TO TEXT CONVERSION

(71) Applicant: Samsung Electronics Co., Ltd., Suwon-si (KR)

(72) Inventors: Sukumar Moharana, Bengaluru (IN); Gopi Ramena, Bengaluru (IN); Rachit S Munjal, Bengaluru (IN); Manoj Goyal, Bengaluru (IN); Rutika Moharir, Bengaluru (IN); Nikhil Arora, Bengaluru (IN); Arun D Prabhu, Bengaluru (IN); Shubham Vatsal, Bengaluru (IN)

(73) Assignee: Samsung Electronics Co., Ltd., Suwon-si (KR)

(*) Notice: Subject to any disclaimer, the term of this patent is extended or adjusted under 35 U.S.C. 154(b) by 357 days.

(21) Appl. No.: 17/859,629

(22) Filed: Jul. 7, 2022

(65) Prior Publication Data

US 2022/0343663 A1    Oct. 27, 2022

Related U.S. Application Data

(63) Continuation of application No. PCT/KR2022/002031, filed on Feb. 10, 2022.

(30) Foreign Application Priority Data

Feb. 10, 2021  (IN) .............................. 202141005677
Feb. 3, 2022   (IN) .............................. 2021 41005677

(51) Int. Cl.
*G06V 30/148*    (2022.01)
*G06V 30/14*     (2022.01)
*G06V 30/22*     (2022.01)

(52) U.S. Cl.
CPC ........ *G06V 30/153* (2022.01); *G06V 30/1444* (2022.01); *G06V 30/22* (2022.01)

(58) Field of Classification Search
CPC combination set(s) only.
See application file for complete search history.

(56) References Cited

U.S. PATENT DOCUMENTS 8,977,057 B1    3/2015  Smith
9,330,086 B2    5/2016  Zhao et al.
(Continued)

FOREIGN PATENT DOCUMENTS

| EP | 1 231 558 A2   | 8/2002 |
| EP | 2 843 592 A2   | 3/2015 |
| WO | 2018/090013 A1 | 5/2018 |

OTHER PUBLICATIONS

Wikipedia; Intelligent character recognition; XP093105118; Jan. 27, 2021.

(Continued)

*Primary Examiner* — Samir A Ahmed
(74) *Attorney, Agent, or Firm* — Jefferson IP Law, LLP

(57) ABSTRACT

A method and system for performing on-device image to text conversion are provided. Embodiments herein relates to the field of performing image to text conversion and more particularly to performing on-device image to text conversion with an improved accuracy. A method performing on-device image to text conversion is provided. The method includes language detection from an image, understanding of text in an edited image and using a contextual and localized lexicon set for post optical character recognition (OCR) correction.

15 Claims, 50 Drawing Sheets

(56) References Cited

U.S. PATENT DOCUMENTS

| | | | |
|---|---|---|---|
| 10,635,934 | B2 | 4/2020 | Wolf et al. |
| 10,671,892 | B1 | 6/2020 | Daskalov et al. |
| 10,733,325 | B1 | 8/2020 | Goodsitt et al. |
| 2014/0169678 | A1* | 6/2014 | Chulinin .............. G06V 10/242 |
| | | | 382/195 |
| 2015/0302242 | A1* | 10/2015 | Lee ...................... G06F 40/131 |
| | | | 382/189 |
| 2016/0154579 | A1* | 6/2016 | Lee ..................... G06F 3/04883 |
| | | | 382/189 |
| 2017/0193323 | A1 | 7/2017 | Reese et al. |
| 2018/0137350 | A1* | 5/2018 | Such .................... G06F 40/242 |
| 2019/0065447 | A1 | 2/2019 | Kim et al. |
| 2020/0005081 | A1 | 1/2020 | Nah et al. |
| 2020/0364463 | A1 | 11/2020 | Pooja et al. |

OTHER PUBLICATIONS

Extended European Search Report dated Dec. 12, 2023; European Appln. No. 22752999.7-1207 / 4182895 PCT/KR2022002031.
Indian Office Action dated Sep. 9, 2022; Indian Appln. No. 202141005677.
Salimzadeh; Improving OCR Quality by Post-Correction; Universiteit van Amsterdam; Master Thesis; Jul. 12, 2019; Amsterdam.
Vastal et al.; On-Device Language Identification of Text in Images using Diacritic Characters; arXiv:2011.05108v1 [cs.CV] Nov. 10, 2020; On-Device AI, Samsung R & D Institute; Nov. 10, 2020; Bangalore, India.
International Search Report with Written Opinion dated Jun. 2, 2022; International Appln. No. PCT/KR2022/002031.

* cited by examiner (RELATED ART)

(RELATED ART)

FIG. 1C

Sachin Tendulkar

"Tendulkar" redirects here. For other people with the same surname, see Tendulkar (surname).

For the film based on the life of Sachin Tendulkar, see Sachin: A Billion Dreams.

Sachin Ramesh Tendulkar (/ˌsʌtʃɪn tenˈduːlkər/ (listen); born 24 April 1973) is a former Indian international cricketer who was also the captain of the Indian national team. He is widely regarded as one of the greatest batsmen in the history of cricket.[5] He is the highest run scorer of all time in International (RELATED ART)

FIG. 7
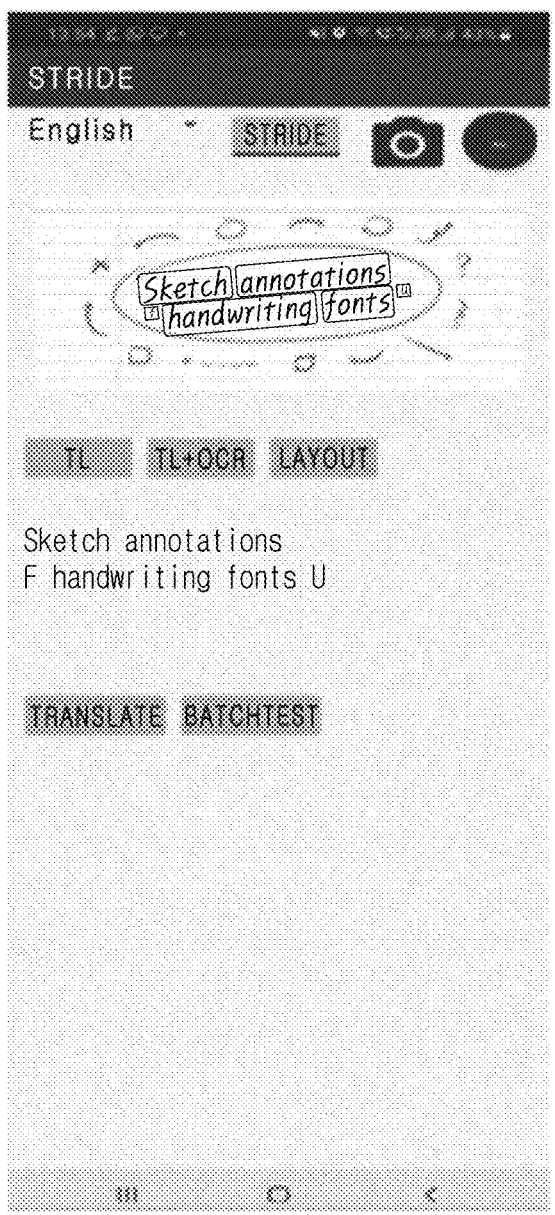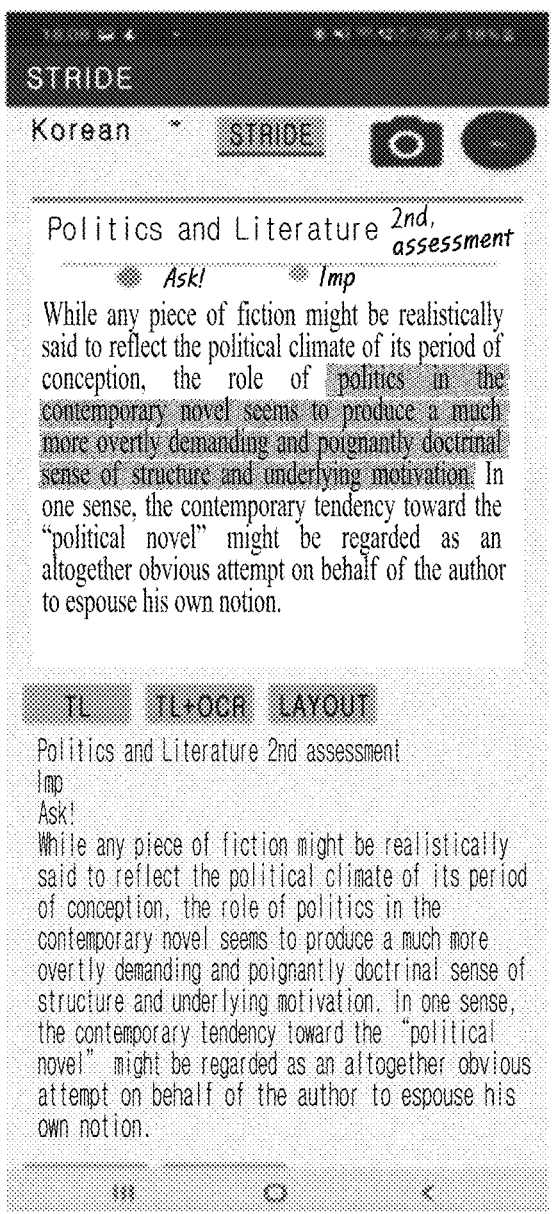

FIG. 18A

| Non text annotation type | Annotation Association | Annotation Action |
|---|---|---|
| Caret | Closest Handwritten text | Insertion |
| Enclosing circle | Enclosed Printed Text | Additional Text Annotation needed |
| Strikethrough | Covered Printed text | Deletion |
| Highlight | Covered Printed Text | Additional Text Annotation needed |

FIG. 18B

| MARK | MEANING | MARK | MEANING |
|---|---|---|---|
| ⋏ | insert *something* in the text | ⟍⟋ | remove an <u>underline</u> |
| ⌐ | delete a punctuation, word, or letter | ○ | spell out (abbrev) or unmber (sc 1 hr) ad one hour) |
| (⌢) | delete and close up sp⌢ace | # | indicate a paragraph |
| ( ) | close up sp⌢ace | ⌒ | run in: no paragraph |
| # | add ⋀space | ⊐⊏ | center⊏ |
| ⟋⟍ | transpose: change order ⟋the | ⋁ ⋀ | superscript ⋁ or subscript ⋀ ($\pi r^2$ or $H_2O$) |
| ⟲ | move word on⟲phrase | ⌒ | comma |
| ⟍ | set in/Lowercase letters (lowercase) | ⊙ | period or colon |
| ⎓ | LOWERCASE a series of capital letters(lowercase) | ⟨⟩ ⟨⟩ | double or single quotation marks or an apostrophe |
| ⎓ | set in capitals(CAPITALS) | = | hyphen(first-class) |
| ⎓ | set in small capitals(450 n.c.) | — | em dash(typewritten ad two hyphens—without spaces) |
| \| | italics (italics) | – | en dash(1:00–3:00 P.M.) |
| ⁓ | boldface(boldface) | | |

FIG. 18C

| Annotation | Annotation class | Coverage | Action |
|---|---|---|---|
| ⬭ | circle | Covered/Intersected Regions | NA |
| ▬ | highlight | Covered/Intersected Regions | NA |
| xxxxxxxx | underlined | Covered/Intersected Regions | NA |
| xxxxxxxx | strikethrough | Covered/Intersected Regions | Delete |
| ⎵ | curlybrace_1 | Along Height | NA |
| ⎵ | curlybrace_2 | Along Width | NA |
| ... | ... | Line closest | ... |
| ∧ | caret | | insert |

FIG. 21

*Abstract*—Optical Character Recognition (OCR) systems have been widely used in various applications for extracting semantic information from images. To give the user more control over their privacy, an on-device solution is needed. The current state of the art models are too heavy and complex to be deployed on-device. We develop an efficient scene text recognition (STR) system, which has only 0.88M parameters and performs real-time text recognition. Attention modules tend to boost the accuracy of

*Abstract*—Optical Character Recognition (OCR) systems have been widely used in various applications for extracting semantic information from images. To give the user more control over their privacy, an on-device solution is needed. The current state of the art models are too heavy and complex to be deployed on-device. We develop an efficient *lightweight* scene text recognition (STR) system, which has only 0.88M parameters and performs real-time text recognition. Attention modules tend to boost the accuracy of

*Abstract*—Optical Character Recognition (OCR) systems have been widely used in various applications for extracting semantic information from images. To give the user more control over their privacy, an on-device solution is needed. The current state of the art models are too heavy and complex to be deployed on-device. We develop an efficient lightweight scene text recognition (STR) system, which has only 0.88M parameters and performs real-time text recognition. Attention modules tend to boost the accuracy

FIG. 25

Diacritics
- It is a sign written above or below a letter to indicate a difference in pronunciation
- Some of the diacritics used in French, which can be used to distinguish it from other Latin Language: â,ê,ĩ,ë,ï,ç.

Umlaut
- A mark(¨) used over a vowel, especially in German, to indicate a different vowel quality.
- German language has 3 umlauts :-Ä,Ö,Ü.

Special Characters
- These characters are specific to certain languages and are not a part of other languages in the script.
- ॡ, ॠ and ऴ are alphabets present in Sanskrit language but not in Hindi and other languages of Devanagari script.

Ligatures
- A ligature is a special character that combines two characters into a single character.
- œ and æ are ligatures present in French Language.

Scene Text

Scene Text Images

Scene Text Images with complex background

Scene Text Images with complex fonts

Camera Captured Images

Skewed Document Text

Skewed scene text

Camera Captured Text

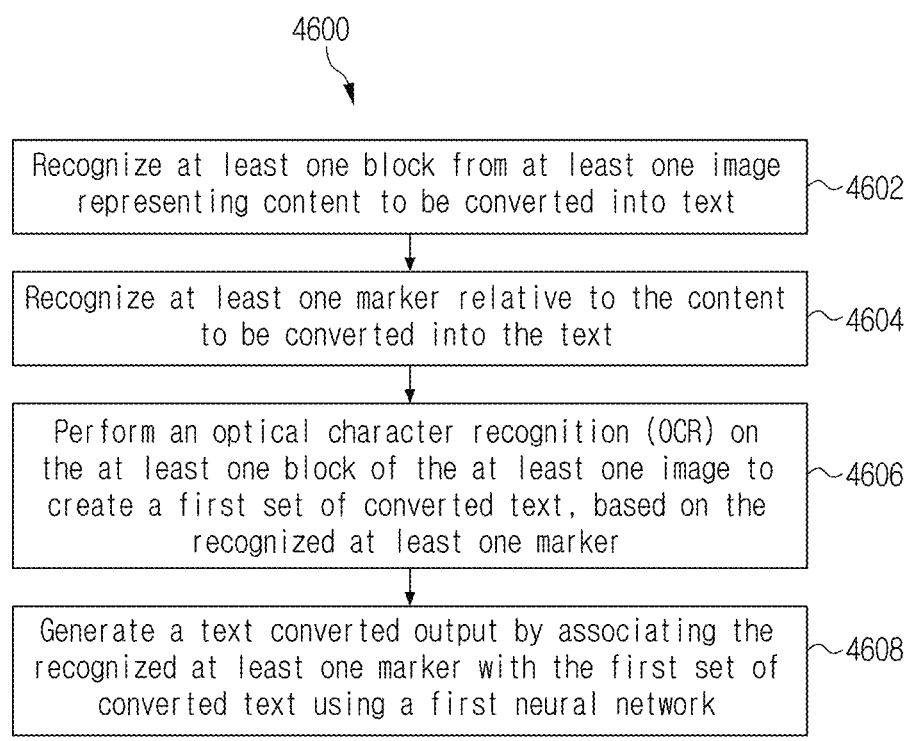

METHODS AND SYSTEMS FOR PERFORMING ON-DEVICE IMAGE TO TEXT CONVERSION

CROSS-REFERENCE TO RELATED APPLICATION(S)

This application is a continuation application, claiming priority under § 365(c), of an International application No. PCT/KR2022/002031, filed on Feb. 10, 2022, which is based on and claims the benefit of an Indian Provisional Specification patent application number 202141005677, filed on Feb. 10, 2021, in the Indian Intellectual Property Office, and of an Indian Complete Specification patent application number 202141005677, filed on Feb. 3, 2022, in the Indian Intellectual Property Office, the disclosure of each of which is incorporated by reference herein in its entirety.

TECHNICAL FIELD

The disclosure relates to the field of performing image to text conversion. More particularly, the disclosure relates to performing on-device image to text conversion with an improved accuracy.

BACKGROUND ART

Optical Character Recognition (OCR) is an electronic or mechanical conversion of images into machine-readable form/text, which has to be used for data processing like editing or searching. The images may include at least one of, typed, handwritten, or printed text. However, existing OCR solutions have no understanding of user edited text like highlighted text, strikethrough, insert, and the like. Thus, resulting in errors in downstream tasks like Visual Question Answering (VQA). Also, the existing OCR solutions may produce errors while converting complex text of the image even though the text is present elsewhere in other clear regions of the image. In addition, language selection from the image is a drawback in many Natural Language Processing (NLP) and vision tasks, since a default language may be taken as a device locale even if the image is in different language.

Some of the existing OCR solutions may include a Machine Learning (ML) kit for performing the image to text conversion. However, the ML Kit supports a Latin language/script as default and does not support other scripts.

Some of the existing OCR solutions are cloud based OCR solutions. The cloud based OCR solutions may execute either a script detection method before the OCR to detect a script for each word/line or a language model for all scripts in parallel after the OCR. Thus, the cloud based OCR solutions are neither scalable to devices due to huge memory usage and power consumption nor respect a user privacy since the image has to be uploaded to a server. Also, the script based OCR has lesser accuracy than the language based OCR.

FIGS. 1A, 1B, and 1C depict drawbacks associated with the existing OCR solutions according to the related art.

Referring to FIG. 1A, an image to be converted into the text includes screenshots in different languages. In such a scenario, the converted text may include errors since the existing OCR solutions consider the device locale as the default language.

Referring to FIG. 1B, an image to be converted into the text includes text in a complex font and also text in clear and simple fonts. In such a scenario, the converted text may include error with respect to the text in the complex font. However, the existing OCR solutions do not use the text in clear and simple fonts for correcting the error in the text of complex fonts since the existing OCR solutions consider a dictionary of words or global knowledge to correct the extracted text from the image.

Referring to FIG. 1C, an image includes user edited portions. However, the existing OCR solutions may ignore such user edited portions while converting the image into the text since the existing OCR solutions have no understanding of the user edited document images.

Thus, the existing OCR solutions do not involve any fast on-device methods to perform the image to text conversion by understanding user edited portions, determining the language from the text in the image, and the like.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide methods and systems for performing on-device image to text conversion.

Another aspect of the disclosure is to provide methods and systems for recognizing at least one block from at least one image representing content to be converted into the text and recognizing, at least one marker relative to the content to be converted into the text.

Another aspect of the disclosure is to provide methods and systems for performing an optical character recognition (OCR) on the at least one block of the at least one image to create a first set of converted text, based on the recognized at least one marker and generating a text converted output by associating the recognized at least one marker with the first set of converted text using a first neural network.

Another aspect of the disclosure is to provide methods and systems for determining a language of at least one text present in the at least one image and generating the text converted output by translating the at least one text present in the at least one image into another language based on the determined language of the at least one text and at least one other text present in the at least one image, and a user input.

Additional aspects will be set forth in part in the description which follows and, in part, will be apparent from the description, or may be learned by practice of the presented embodiments.

Technical Solution

In accordance with an aspect of the disclosure, methods and systems for converting an image to text are provided. The method includes recognizing at least one block from at least one image representing content to be converted into the text. The method includes recognizing at least one marker relative to the content to be converted into the text, wherein the at least one marker indicates at least one of, at least one handwritten text, at least one lexicon and associated directional properties, at least one non-text annotation, and at least one user edited text segment. The method includes performing an optical character recognition (OCR) on the at least one block of the at least one image to create a first set of converted text, based on the recognized at least one marker. The method includes generating a text converted output by associating the recognized at least one marker with the first set of converted text using a first neural network.

In accordance with another aspect of the disclosure, an electronic device for converting an image to text, wherein the electronic device is provided. The method includes a memory and a controller coupled to the memory. The controller is configured to recognize at least one block from at least one image representing content to be converted into the text. The controller is configured to recognize at least one marker relative to the content to be converted into the text, wherein the at least one marker indicates at least one of, at least one handwritten text, at least one lexicon and associated directional properties, at least one non-text annotation, and at least one user edited text segment. The controller is configured to perform an optical character recognition (OCR) on the at least one block of the at least one image to create a first set of converted text, based on the recognized at least one marker. The controller is configured to generate a text converted output by associating the recognized at least one marker with the first set of converted text using a first neural network.

In accordance with another aspect of the disclosure, an on-device image to text conversion method is provided. The method includes recognizing, by an electronic device, one or more blocks of images representative of content to be converted into text, recognizing, by the electronic device, markers indicative of handwritten texts, lexicons and associated directional properties relative to the content to be converted into the text, performing, by the electronic device, an optical character recognition on the one or more blocks of images to create a first set of converted text and applying, by the electronic device, a pre-learned Artificial Intelligence (AI) model to associate the recognized handwritten texts, lexicons and associated directional properties with the first set of converted text to create a final image to text converted output.

In accordance with another aspect of the disclosure, an on-device text recognition method is provided. The method includes, receiving, by an electronic device (200), an image containing one or more text blocks as an input, identifying, by the electronic device, one or more user edited text segments in the one or more text blocks, extracting, by the electronic device, the one or more text blocks, the one or more user edited text segments from the image and the relative location of each of the user edited text segments and modifying, by the electronic device, the extracted one or more text blocks by inserting the identified one or more user edited text segments at the relative location.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 1A, 1B, and 1C depict drawbacks associated with existing optical character recognition (OCR) solutions according to the related art;

FIG. 7 is an example diagram depicting recognition of a handwritten text and a printed text in an image, according to an embodiment of the disclosure;

FIGS. 18A, 18B, and 18C depict non-text annotation properties tables, according to various embodiments of the disclosure;

FIG. 21 is an example diagram depicting Portable Document Format (PDF) editing in a smart note application, according to an embodiment of the disclosure;

FIG. 25 depicts details of discriminative features associated with words of text in an image, according to an embodiment of the disclosure;

FIG. 46 is a flow chart depicting a method for converting an image into text, according to an embodiment of the disclosure.

The same reference numerals are used to represent the same elements throughout the drawings.

MODE FOR INVENTION

Figure 1A:
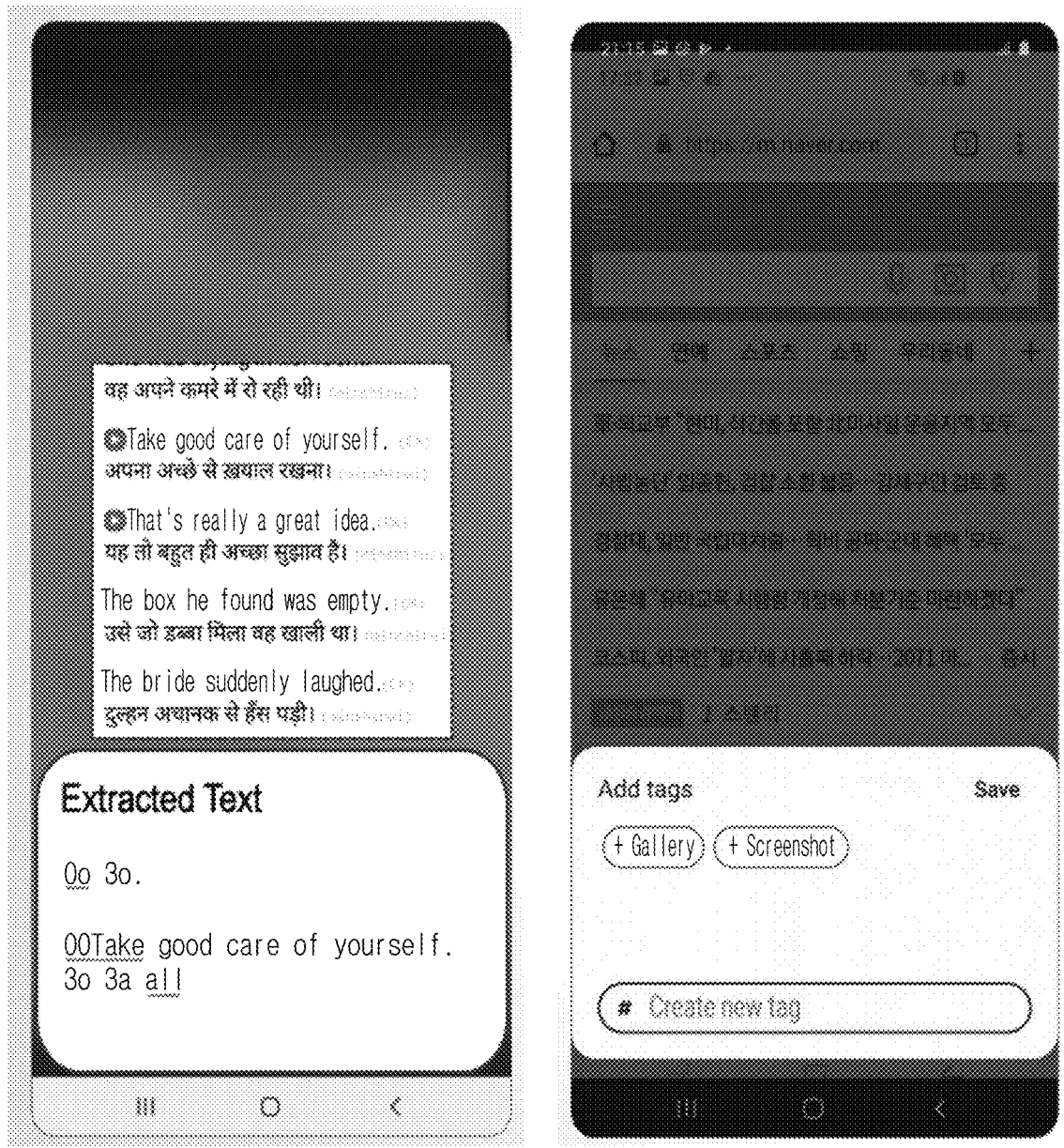
Figure 1B:
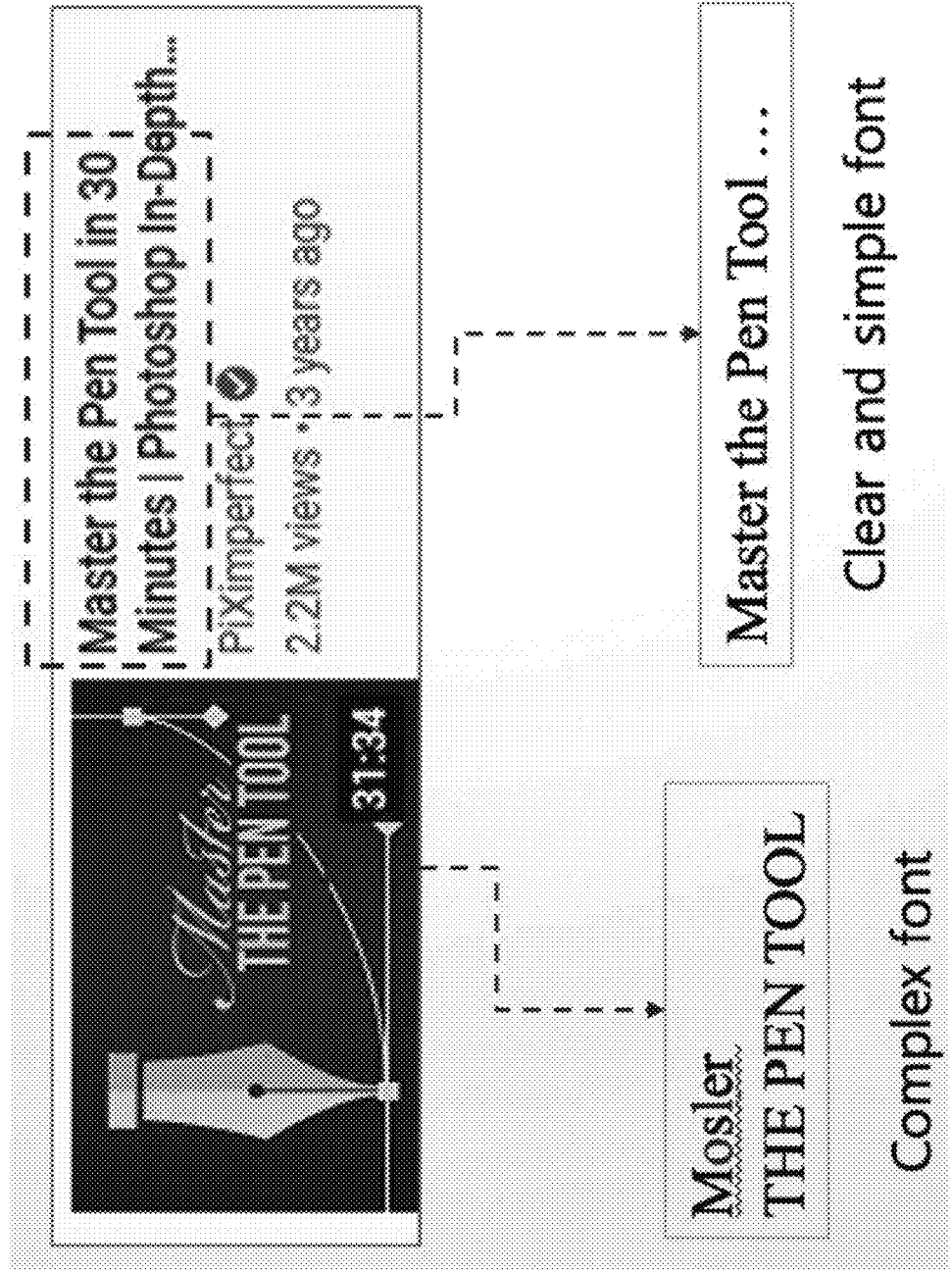

The following description with reference to accompanying drawings provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for performing on-device image to text conversion including language detection from an image, understanding of text in an edited image and using a contextual and localized lexicon set for post optical character recognition (OCR) correction.

Referring now to the drawings, and more particularly to FIGS. 2 through 46, where similar reference characters denote corresponding features consistently throughout the figures, there are shown example embodiments.

Figure 2:
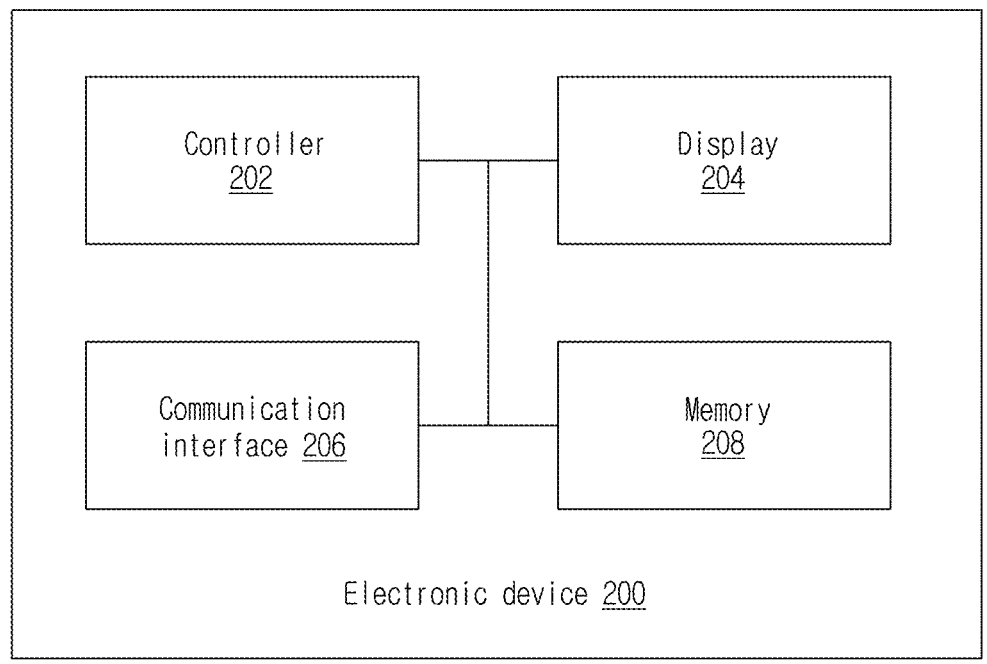
FIG. 2 depicts an electronic device for performing image to text conversion, according to an embodiment of the disclosure.

FIG. 2 depicts an electronic device for performing image to text conversion, according to an embodiment of the disclosure.

An electronic device 200 referred herein may be any user device capable of supporting media. Examples of the electronic device 200 may be, but are not limited to, a smart phone, a mobile phone, a video phone, a computer, a tablet personal computer (PC), a laptop, a wearable device, a personal digital assistant (PDA), an IoT device, a server (a standalone server or a server on a cloud), or any other device that supports the media. Examples of the media may be, but are not limited to, an image, text, or the like.

The electronic device 200 may be configured to perform the image to text conversion to convert the images into text. In an embodiment, the electronic device 200 converts the images into the text by including language detection from an image, understanding of the text in an edited image and using a contextual and localized lexicon set for post optical character recognition (OCR) correction.

The electronic device 200 includes a controller/processor 202, a display 204, a communication interface 206, and a memory 208.

The controller 202 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 202 may be configured to convert the image(s) into the text. The image referred herein may include at least one of, but is not limited to, a camera captured image, a screenshot, a computer-generated image, an image shared across social networking sites, a Portable Document Format (PDF), a website post, a document, notes, and the like. In an example, the image may be stored in the memory 208. In another example, the controller 202 may receive the image for the conversion from at least one external device through a communication network. Examples of the at least one external device may be, but is not limited to, a server, a database, another electronic device, and the like. Examples of the communication network may be, but are not limited to, a wired network, a value-added network, a wireless network, a satellite network, or a combination thereof.

The controller 202 may provide various applications to user, through which the user may select the image for the image to text conversion. Examples of the applications may be, but are not limited to, a phot editing application, a note application, a tagboard application, a gallery application, a vision translate application, a search application, and the like.

In an embodiment, the controller 202 converts the image into the text using a first neural network 302.

For converting the image into the text, the controller 202 recognizes one or more blocks from the image, which represent a content to be converted into the text.

Figure 4:
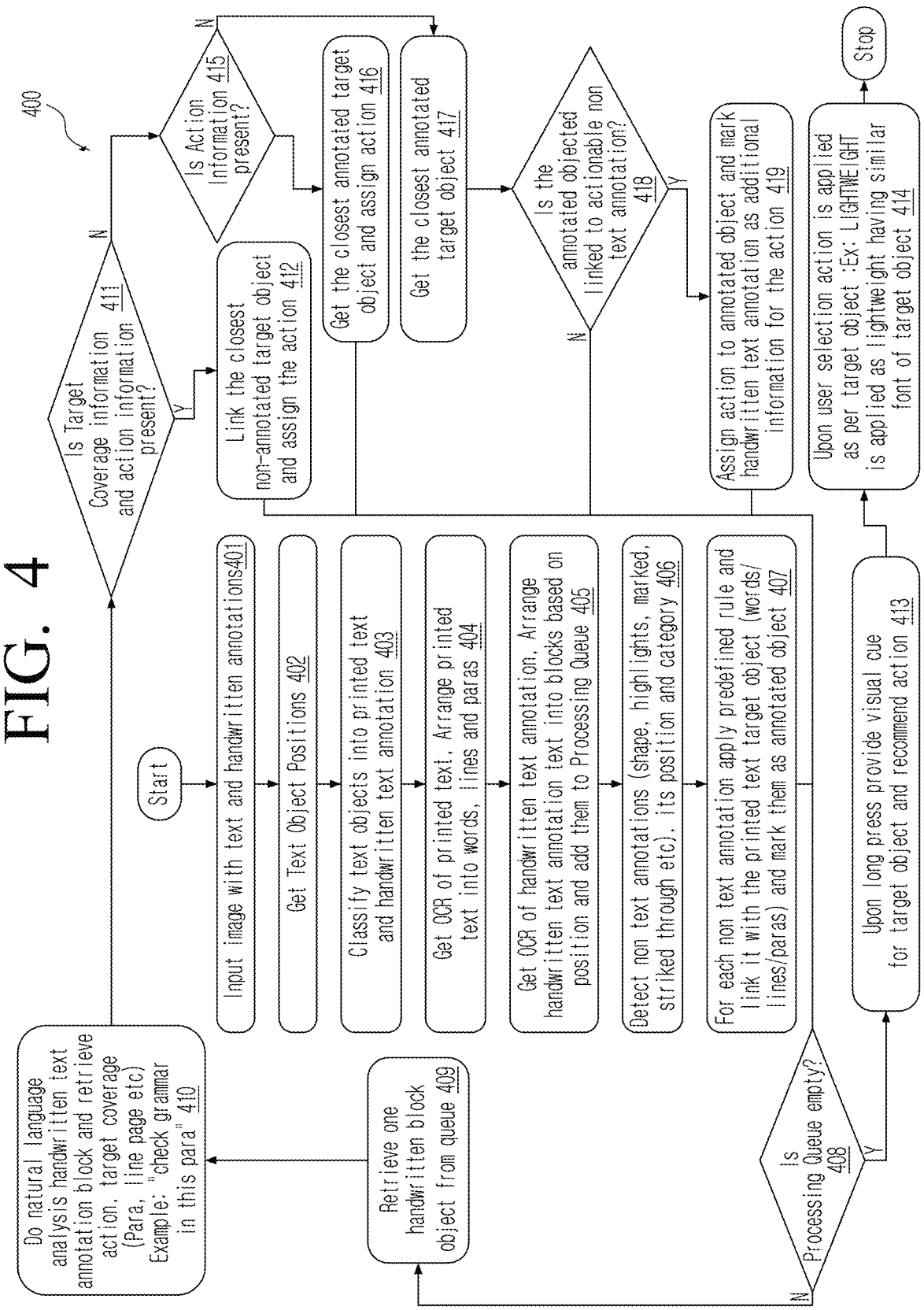
FIG. 4 is an example flow diagram depicting a method for converting the image into text, according to an embodiment of the disclosure.
Figure 5:
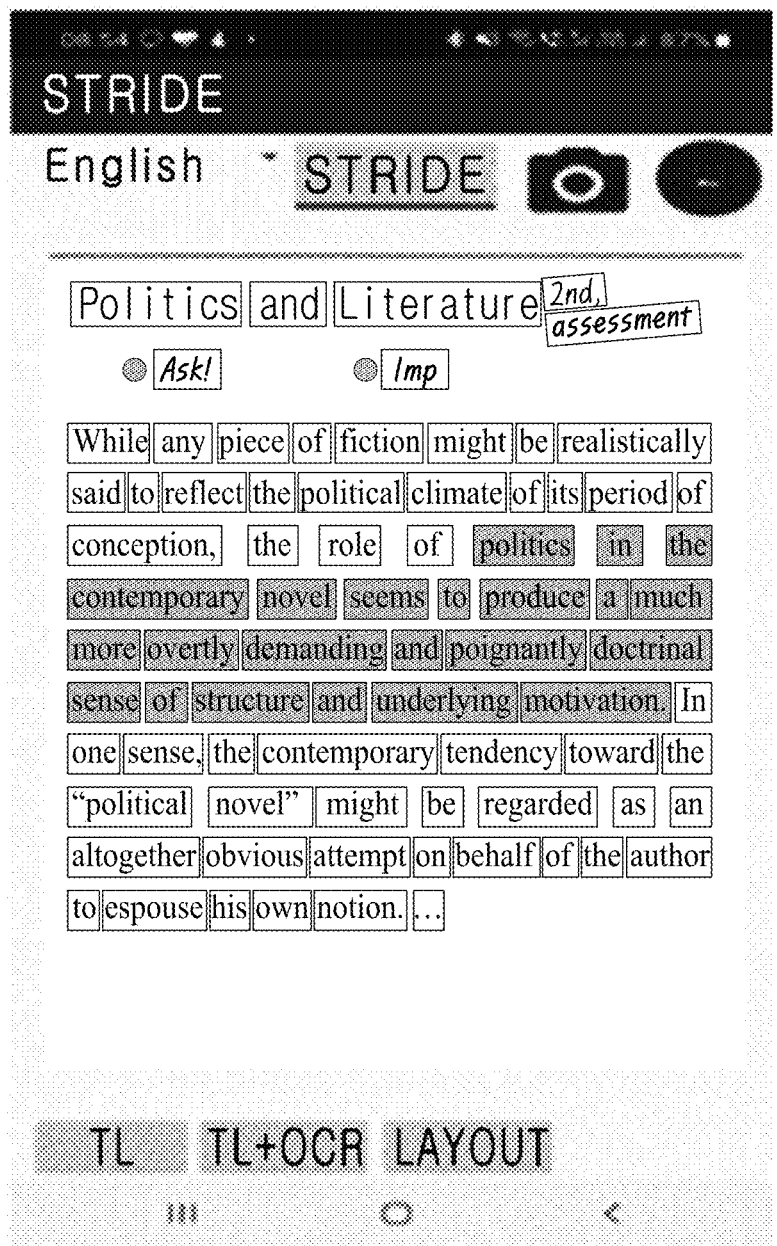
FIG. 5 is an example diagram depicting detection of positions of text in an image, according to an embodiment of the disclosure.

Referring to FIGS. 4 and 5, the text words are arranged into blocks based on their respect positions.

The controller 202 recognizes the one or more markers relative to the content to be converted into the text. Examples of the markers may be, but are not limited to, at least one handwritten text/handwritten annotation, at least one lexicon, at least one non-text annotation, at least one user edited text segment, and the like. The handwritten text may include text written by the user manually on the image. The lexicon may include information such as, semantic, grammatical, and the like, about individual words, or word strings present in the text of the image. The non-text annotation may include at least one of, but is not limited to, a shape, a highlight, marked, strikethrough, and the like. The user edited text segment may include edited symbols such as, but are not limited to, an insertion, a deletion, an underline, and the like.

For recognizing the handwritten text and the printed text, the controller 202 analyzes parameters such as, but are not limited to, edited symbols (as depicted in FIG. 18), a text/character map, a link/affinity map, an annotation/handwritten map, a script map, and the like. Embodiments herein use the terms 'map' and 'score' interchangeably. Based on the analyzed parameters, the controller 202 recognizes the handwritten text and the printed text in the content of the one or more blocks of the image that have to be converted into the text. The edited symbols include at least one of, but is not limited to, an insertion mark, a strikethrough, a highlight, an underline, references, and the like. The text/character map indicates a probability of a text pixel or no text. The link/affinity map indicates a probability of a pixel linked between a character of a word present in the content to be converted into the text. The annotation/handwritten map indicates a probability of the text pixel being handwritten or not. The script map indicates a probability of the text pixel being associated with a particular language (for example, Latin) or not.

Figure 6:
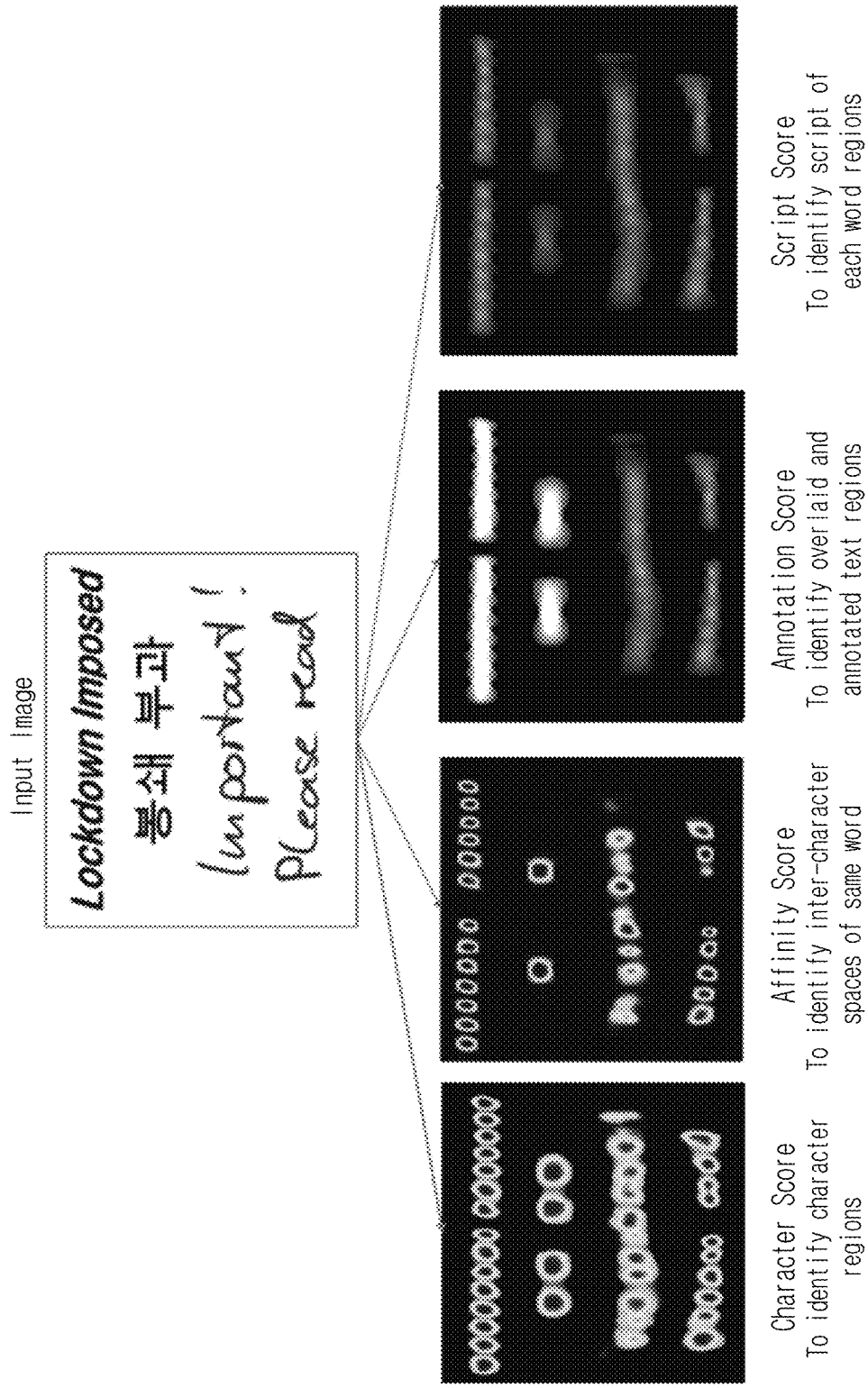
FIG. 6 is an example diagram depicting performing of a text localization to recognize one or more markers in an image, according to an embodiment of the disclosure.

For recognizing the non-text annotation, the controller 202 trains a second neural network 304 to segment the image into a foreground non-text annotation map/score (as depicted in FIG. 6) and a background image. The controller 202 applies a connected component analysis on the thresholded foreground non-text annotation map to recognize the non-text annotation and an associated position in the one or more blocks including the content to be converted into the text. In an embodiment herein, the connected component analysis can comprise of using computer vision to determine connected regions from the pixel wise output from the neural network. This helps in forming the maps/scores (as shown in FIG. 6) which translates to text boxes in the image (as shown in FIG. 5). The controller 202 also determines a category of the recognized non-text annotation. For determining the category of the recognized non-text annotation, the controller 202 crops the recognized non-text annotation from the one or more blocks. The controller 202 processes the cropped non-text annotation using a third neural network 306 to determine a category of the recognized non-text annotation.

The controller 202 analyzes the edited symbols to recognize the user edited segment in the one or more blocks including the content to be converted into the text.

Once the one or more markers have been recognized, the controller 202 performs an OCR on the one or more blocks of the image to create a first set of converted text, based on the recognized one or more markers. The first set of converted text includes arranged at least one of, lines, words, paragraphs, and the like of the text present in the image with respect to the recognized one or more markers.

For creating the first set of converted text, the controller 202 analyzes the printed text in the one or more blocks of the image including the content to be converted into the text. The controller 202 creates the first set of converted text by arranging the recognized one or more markers with respect to the printed text in the image. Further, on creating the first set of converted text, the controller 202 performs a correction of the first set of converted text (may also be referred as a post OCR correction) based on visual characteristics of the image, contextual and localized lexicons extracted from the image, annotation of objects present in the image, objects (i.e., physical objects for example, a clock, a machine, and the like) present in the image, translated text belonging to other scripts present in the one or more blocks of the image, a confidence value of the recognized marker, and the like. In an example, the object (clock) serves as a context identified from visual characteristics in the image (as depicted in the example in FIG. 13). The controller 202 may extract the contextual lexicons from the visual characteristics and metadata of the image. The metadata of the image may include at least one of, a location where the image was captured, date/time of capturing the image, hashtags (if any) stored with the image, settings used for capturing the image, and the like. The controller 202 may extract the localized lexicons from clear text regions and a part/region of the image having a high confidence value compared to other parts of the image.

On creating and correcting the first set of converted text, the controller 202 generates the text converted output by associating the recognized one or more markers with the first set of converted text. The text converted output may be the text converted from the image. The controller 202 associates the recognized one or more markers with the first set of converted text using the first neural network 302.

If the recognized one or more markers include the handwritten text, the controller 202 detects the position and the proximity of the handwritten text with respect to the printed text in the content of the one or more blocks to be converted into the text. For detecting the position of the handwritten text with respect to the printed text, the controller 202 segments pixels of the one or more blocks of the image into text and non-text. The controller 202 detects the position of the handwritten text by applying the connected component analysis on the segmented pixels. In an embodiment herein, the connected component analysis can comprise using computer vision to determine connected regions from the pixel wise output from the neural network. This helps in forming the maps/scores (as shown in FIG. 6) which translates to text boxes in the image (as shown in FIG. 5). The controller 202 prepares a target action based on the position and proximity of the handwritten text with respect to the corresponding printed text. In an example herein, the target action is to arrange/associate the handwritten text with the printed text. The controller 202 prepares the target action by cropping the words corresponding to the handwritten text from the content of the one or more blocks in the image based on the position and the proximity of the handwritten text with respect to the printed text. On preparing the target action, the controller 202 applies the target action on the first set of identified or recognized text to generate the converted text (i.e., a target object) using the first neural network 302 to generate the text converted output. The text converted output includes the printed text and the handwritten text.

If the recognized one or more markers include the non-text annotation, the controller 202 determines a non-text annotation property for the recognized non-text annotation using an annotation properties table. The annotation properties table includes the non-text annotation property for each non-text annotation. The non-text annotation property indicates a mapping of each of a plurality of non-text annotations with an annotation association and at least one annotation action. For example, if the non-text annotation includes an insertion mark, the associated non-text annotation property indicates to insert something in the text. For another example, if the non-text annotation includes a delete mark, the associated non-text annotation property indicates to delete punctuation, a letter, a word, and the like, in the text. On determining the non-text annotation property for the recognized non-text annotation, the controller 202 prepares an annotation action/target action. In an example herein, the annotation action indicates an association of the non-text annotation with the printed text or the handwritten text present in the content of the one or more blocks of the image that has to be converted into the text. The controller 202 prepares the annotation action based on at least one of, but is not limited to, the recognized non-text annotation and the associated non-text annotation property, the position of the non-text annotation with respect to the printed text or the handwritten text, the category of the non-text annotation, and the like. On preparing the annotation action, the controller 202 applies the annotation action on the first set of converted text using the first neural network 302 to generate the text converted output. Alternatively, the controller 202 provides the annotation action to a user and receives a user input from the user to apply the annotation action. On receiving the user input from the user to apply the annotation action, the controller 202 applies the annotation action on the first set of converted text using the first neural network 302 to generate the text converted output. The controller 202 also indexes the text converted output with respect to the corresponding non-text annotation. The controller 202 presents the text converted output to the user based on the associated non-text annotation for searching.

If the recognized one or more markers include the user edited segment, the controller 202 determines a relative location of the user edited segment in the content of the one or more blocks of the image that have to be converted into the text. The controller 202 creates an edit action/target action based on the determined relative location of the user edited segment. In an example herein, the edit action indicates modifying of the print text or the handwritten text in the content of the one or more blocks of the image based on the user edited segment. The controller 202 applies the edit action on the first set of converted text using the first neural network 302 to generate the text converted output.

The controller 202 may also be configured to generate the text converted output by translating the text in the image from one language to another language (i.e., based on a language translation/language transition). For generating the text converted output based on the language translation, the controller 202 determines a language of the text in the image automatically without requiring the user input, wherein the text may include the printed text and/or the handwritten text. For detecting the language of the text in the image, the controller 202 detects the scripts of words of the text present in the image. The controller 202 detects presence of discriminative features associated with each word of the text. The discriminative features include at least one of, but is not limited to, diacritics, umlaut, special characters, ligatures, and the like. The controller 202 determines the language of each word of the text based on the detected discriminative features and a natural language processing (NLP) of the words of the text. Once the language of the text has been determined, the controller 202 generates the text converted output by translating the text of the image into another language based on the determined language of the text and language of other text present in the image, and the user input. In an example, the user input may be a gesture performed by the user on the image to convert the text from one language to another language.

The display 204 may be configured to enable the user to interact with the electronic device 200, and to provide the input/user input. The display 204 may also be configured to provide/display the text converted output to the user.

The communication interface 206 may be configured to enable the electronic device 200 to communicate with the at least one external entity using an interface supported by the communication network. Examples of the interface may be, but are not limited to, a wired interface, a wireless interface, or any structure supporting communications over a wired or wireless connection.

The memory 208 referred may include at least one of, but is not limited to, NAND, embedded Multimedia Card (eMMC), Secure Digital (SD) cards, Universal Serial Bus (USB), Serial Advanced Technology Attachment (SATA), solid-state drive (SSD), and the like. Further, the memory 208 may include one or more computer-readable storage media. The memory 208 may include one or more non-volatile storage elements. Examples of such non-volatile storage elements may include Random Access Memory (RAM), Read Only Memory (ROM), magnetic hard discs, optical discs, floppy discs, flash memories, or forms of electrically programmable memories (EPROM) or electrically erasable and programmable (EEPROM) memories. In addition, the memory 208 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that may, over time, change (e.g., in Random Access Memory (RAM) or cache).

The memory 208 may store at least one of, the blocks of the image that has to be converted into the text, the content of the blocks, the one or more markers, the first set of converted text, the text converted output, and the like.

The memory 208 may also include an image to text converter 300. The image to text converter 300 may be executed by the controller 202 to convert the image into the text.

The memory 208 may also include the first neural network 302, the second neural network 304, and the third neural network 306. The first neural network 302 may be executed/processed by the controller 202 to apply the target action on the first set of converted text to generate the text converted output. The second neural network 304 may be executed/processed by the controller 202 to segment the image into the foreground non-text annotation map and the background image. The third neural network 306 may be executed/processed by the controller 202 to determine the category of the non-text annotation.

Examples of the first neural network 302, the second neural network 304, and the third neural network 306 may be, but are not limited to, an Artificial Intelligence (AI) model, a multi-class Support Vector Machine (SVM) model, a Convolutional Neural Network (CNN) model, a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep reinforcement model (with ReLU activation), a deep Q-network, and the like. The first neural network 302, the second neural network 304, and the third neural network 306 may include a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and the like. Each layer has a plurality of weight values and performs a layer operation through calculation of a previous layer and an operation of a plurality of weights/coefficients. A topology of the layers of the first neural network 302, the second neural network 304, and the third neural network 306 may vary based on the type of the respective network. In an example, the first neural network 302, and the second neural network 304 may include an input layer, an output layer, and a hidden layer. The input layer receives a layer input and forwards the received layer input to the hidden layer. The hidden layer transforms the layer input received from the input layer into a representation, which may be used for generating the output in the output layer. The hidden layers extract useful/low level features from the input, introduce non-linearity in the network and reduce a feature dimension to make the features equivalent to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The first neural network 302, the second neural network 304, and the third neural network 306 may be trained using at least one learning method to generate the text converted output by applying the target action on the first set of converted text, to segment the image into the non-text annotation map and the background image, and to determine the category of the non-text annotation, respectively. Examples of the learning method may be, but are not limited to, supervised learning, unsupervised learning, semi-supervised learning, reinforcement learning, regression-based learning, and the like. The trained first neural network 302, second neural network 304, and third neural network 306 may be a neural network model in which a number of layers, a sequence for processing the layers and parameters related to each layer may be known and fixed for performing the intended functions. Examples of the parameters related to each layer may be, but are not limited to, activation functions, biases, input weights, output weights, and the like, related to the layers. A function associated with the learning method may be performed through the non-volatile memory, the volatile memory, and the controller 202. The controller 202 may include one or a plurality of processors. At this time, one or a plurality of processors may be a general purpose processor, such as a central processing unit (CPU), an application processor (AP), and the like, a graphics-only processing unit such as a graphics processing unit (GPU), a visual processing unit (VPU), and/or an Artificial Intelligence (AI)-dedicated processor such as a neural processing unit (NPU).

Here, being provided through learning means that, by applying the learning method to a plurality of learning data, a predefined operating rule or the first neural network 302, the second neural network 304, and the third neural network 306 of a desired characteristic is made. Functions of the first neural network 302, the second neural network 304, and the third neural network 306 may be performed in the electronic device 200 itself in which the learning according to an embodiment is performed, and/or may be implemented through a separate server/system.

Figure 3:
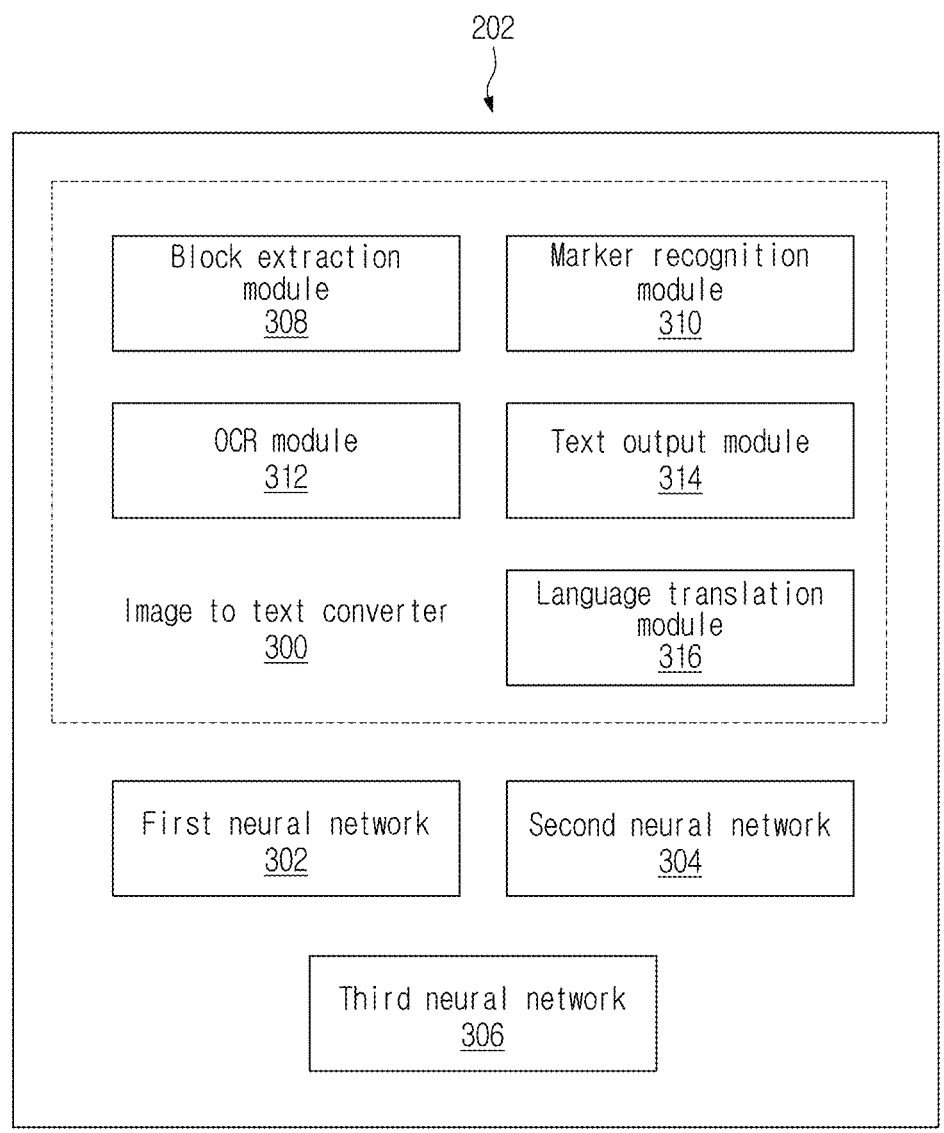
FIG. 3 depicts an image to text converter performable in the electronic device for converting an image into text, according to an embodiment of the disclosure.

FIG. 3 depicts the image to text converter 300 performable in the electronic device 200 for converting the image into the text, according to an embodiment of the disclosure.

The image to text converter 300 includes a block extraction module 308, a marker recognition module 310, an OCR module 312, a text output module 314, and a language translation module 316.

The block extraction module 308 may be configured to extract the one or more blocks from the image, which includes the content to be converted into the text.

The marker recognition module 310 may be configured to recognize the one or more markers relative to the content to be converted into the text. The one or more markers may include at least one of, the handwritten text, the one or more lexicons and the associated directional properties, the non-text annotation, the user edited text segment, and the like.

The OCR module 312 may be configured to perform the OCR on the content of the one or more blocks of the image to create the first set of converted text, based on the recognized one or more markers.

The text output module 314 may be configured to generate the text converted output by associating the recognized one or more markers with the first set of converted text using the first neural network 302. The text converted output includes the one or more markers and the printed text.

The language translation module 316 may be configured to translate the text present in the image of one language to another language. The language translation module 316 detects the scripts of the words of the text, and the presence of the discriminative features associated with each word. The language translation module 316 determines the language of the text based on the scripts of the words and the associated discriminative features, and the NLP of the words of the text. The language translation module 316 translates the text present in the image from one language to another based on the determined language of the text and the language of other text present in the image.

FIGS. 2 and 3 show blocks of the electronic device 200, but it is to be understood that other embodiments are not limited thereon. In other embodiments, the electronic device 200 may include less or more number of blocks. Further, the labels or names of the blocks are used only for illustrative purpose and do not limit the scope of the embodiments herein. One or more blocks may be combined together to perform same or substantially similar function in the electronic device 200.

FIG. 4 is an example flow diagram depicting a method for converting an image into text, according to an embodiment of the disclosure.

At operation 401, the electronic device may receive the image with the text (the printed text) and the handwritten annotations. At operation 402, the electronic device 200 may identify the positions of the text in the image. At operation 403, the electronic device 200 may classify the text into the printed text and the handwritten annotations. At operation 404, the electronic device 200 may perform the OCR on the image to create the first set of converted text by arranging the printed text into words, lines, and paragraphs.

At operation 405, the electronic device 200 may obtain the OCR of the handwritten annotation and arranges the handwritten annotation into the one or more blocks based on the position of the handwritten annotation. The electronic device 200 adds the OCR of the handwritten annotation to a processing queue.

At operation 406, the electronic device 200 may detect the non-text annotations and the associated position and category. At operation 407, the electronic device 200 may directly link non-text annotation to relevant nearest printed text and links each non-text annotation with the printed text and marks the linked non-text annotation as an annotated object.

At operation 408, the electronic device 200 may check if the processing queue is empty. If the processing queue is empty, the electronic device 200 may performs operation 413. If the processing queue is not empty, at operation 409, the electronic device 200 may retrieve the block corresponding to the handwritten annotation from the processing queue. At operation 410, the electronic device 200 may perform the NLP on the block corresponding to the handwritten annotation and retrieves the target action and a target coverage. In an example herein, the target coverage may indicate at least one of, a paragraph (para), a line, a page, or the like. In an example herein, the target action may indicate to check grammar in a specific para/line, or the like. On performing the NLP, at operation 411, the electronic device 200 may check if the target coverage and the target action are present.

If the target coverage and the target action are present, at operation 412, the electronic device 200 may link the closest non-annotated target object and assigns the target action. On linking the closest non-annotated target object and assigning the target action, the electronic device 200 may perform operation 408 to check if the processing queue is empty. If the processing queue is not empty, the electronic device 200 repeats operations 409-412. If the processing queue is empty, at operation 413, the electronic device 200 may provide a visual cue for the target object and the recommended target action to the user, upon long press by the user on the image. At operation 414, the electronic device 200 may apply the target action on the target object, when the user confirms the target object and the target action.

If the target coverage and the target action are not present, at operation 415, the electronic device 200 may check if information related to the target action is present. If the information related to the target action is present, at operation 416, the electronic device 200 may obtain the closet annotated target object and assigns the target action. The electronic device 200 may then starts performing from operation 408.

If the information related to the target action is present, at operation 417, the electronic device 200 may obtain the closest annotated target object. At operation 418, the electronic device 200 may check if the obtained annotated target object is linked to the actionable non-text annotation. If the obtained annotated target object is not linked to the actionable non-text annotation, the electronic device 200 may start performing from operation 408.

If the obtained annotated target object is linked to the actionable non-text annotation, at operation 419, the electronic device 200 may assign the target action to the annotated object and marks the handwritten text as the additional information for the target action. On assigning the target action, the electronic device 200 starts performing from operation 408. The various actions in method 400 may be performed in the order presented, in a different order or simultaneously. Further, in some embodiments, some actions listed in FIG. 4 may be omitted.

FIG. 5 is an example diagram depicting detection of positions of the text in the image, according to an embodiment of the disclosure.

Embodiments herein enable the electronic device 200 to use the second neural network 304 to segment the pixels of the image into the text and the non-text. The electronic device 200 applies the connected component analysis on the pixels segmented into the text to determine word boxes and associated coordinates. The word boxes and the associated coordinates may provide information about the positions of the text (the printed text and the handwritten text) in the image. Thus, the electronic device 200 may be able to detect the position of the text in the image with complex background and any orientation.

FIG. 6 is an example diagram depicting performing of a text localization to recognize the one or more markers in the image, according to an embodiment of the disclosure.

The electronic device 200 performs the text localization on the image to recognize the one or more markers present in the image. In an embodiment herein, performing the text localization refers to analyzing the text/character map, the link/affinity map, the annotation/handwritten map, and the script map of the image. The text/character map/character score may be used to identify the regions in the image including the characters. The link/affinity map/affinity score may be used to identify inter-character spaces of the same word in the image. The annotation/handwritten map/annotation score may be used to identity the overlaid and annotated text regions in the image. The script map/script score may be used to identify the script of each word in the region.

FIG. 7 is an example diagram depicting recognition of handwritten text and printed text in an image, according to an embodiment of the disclosure.

Referring to FIG. 7, the electronic device 200 analyzes at least one of, the edited symbols, the text/character map, the link/affinity map, the annotation/handwritten map, and the script map to recognize the at least one handwritten text and at least one printed text in the content of the image to be converted into the text.

Figure 8:
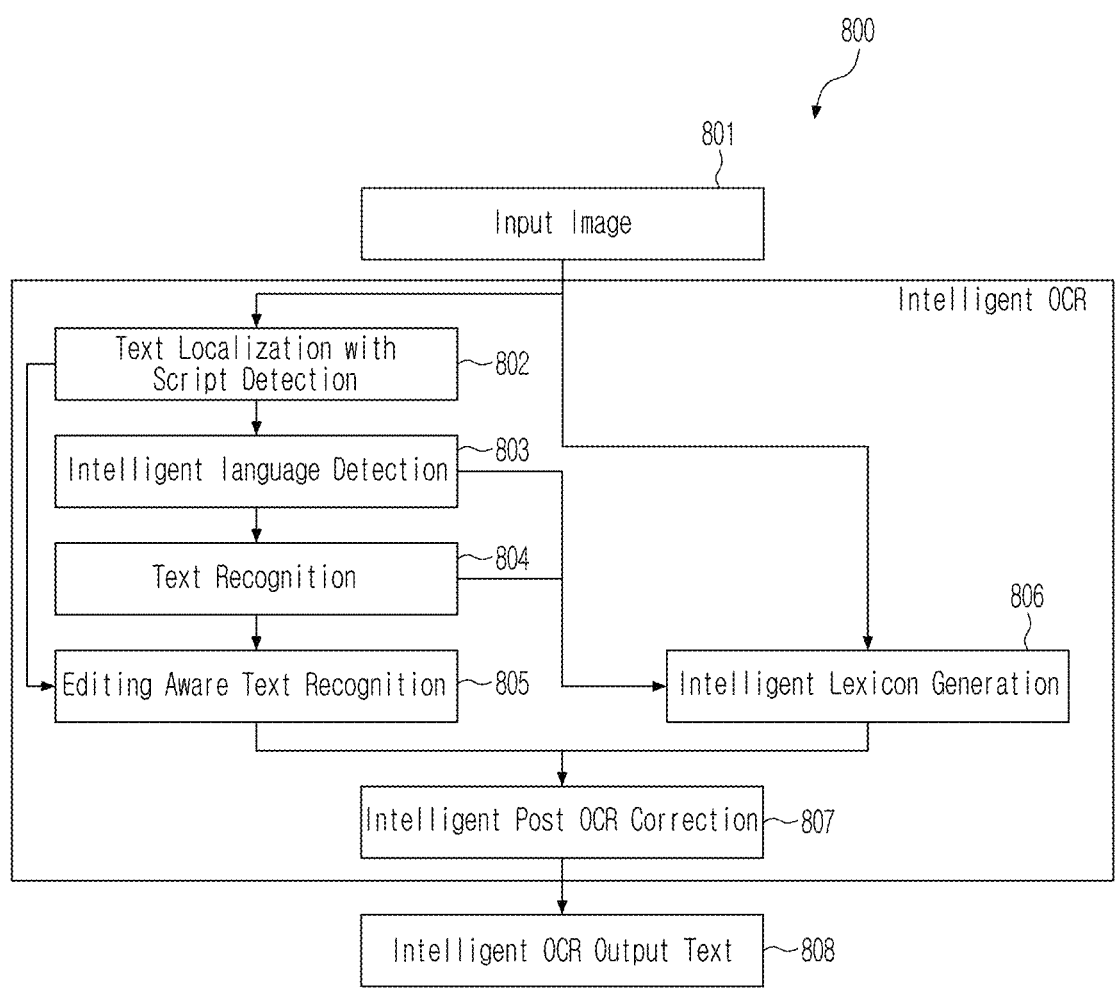
FIG. 8 is an example flow diagram depicting a method for performing a post OCR correction on a first set of converted text, according to an embodiment of the disclosure.

FIG. 8 is an example flow diagram depicting a method for performing post OCR correction on a first set of converted text, according to an embodiment of the disclosure.

Referring to FIG. 8, at operation 801, the electronic device 200 may receive the image that has to be converted into the text.

At operation 802, the electronic device 200 may detect the scripts of the words of the text present in the image. At operation 803, the electronic device 200 may detect the language of the text present in the image. At operation 804, the electronic device 200 may recognize the one or more blocks of the image that have to be converted into the text. At operation 805, the electronic device 200 may recognize the one or more markers/user edited segments preset in the one or more blocks of the image. At operation 806, the electronic device 200 may extract the contextual and localized lexicons from at least one of, the received image, the language of the text, the one or more markers, and the like.

On extracting the contextual and localized lexicons, at operation 807, the electronic device 200 may perform the OCR correction on the first set of converted text. At operation 808, the electronic device 200 may generate the text converted output by applying the target action on the corrected first set of converted text. The various actions in method 800 may be performed in the order presented, in a different order or simultaneously. Further, in some embodiments, some actions listed in FIG. 8 may be omitted.

Figure 9:
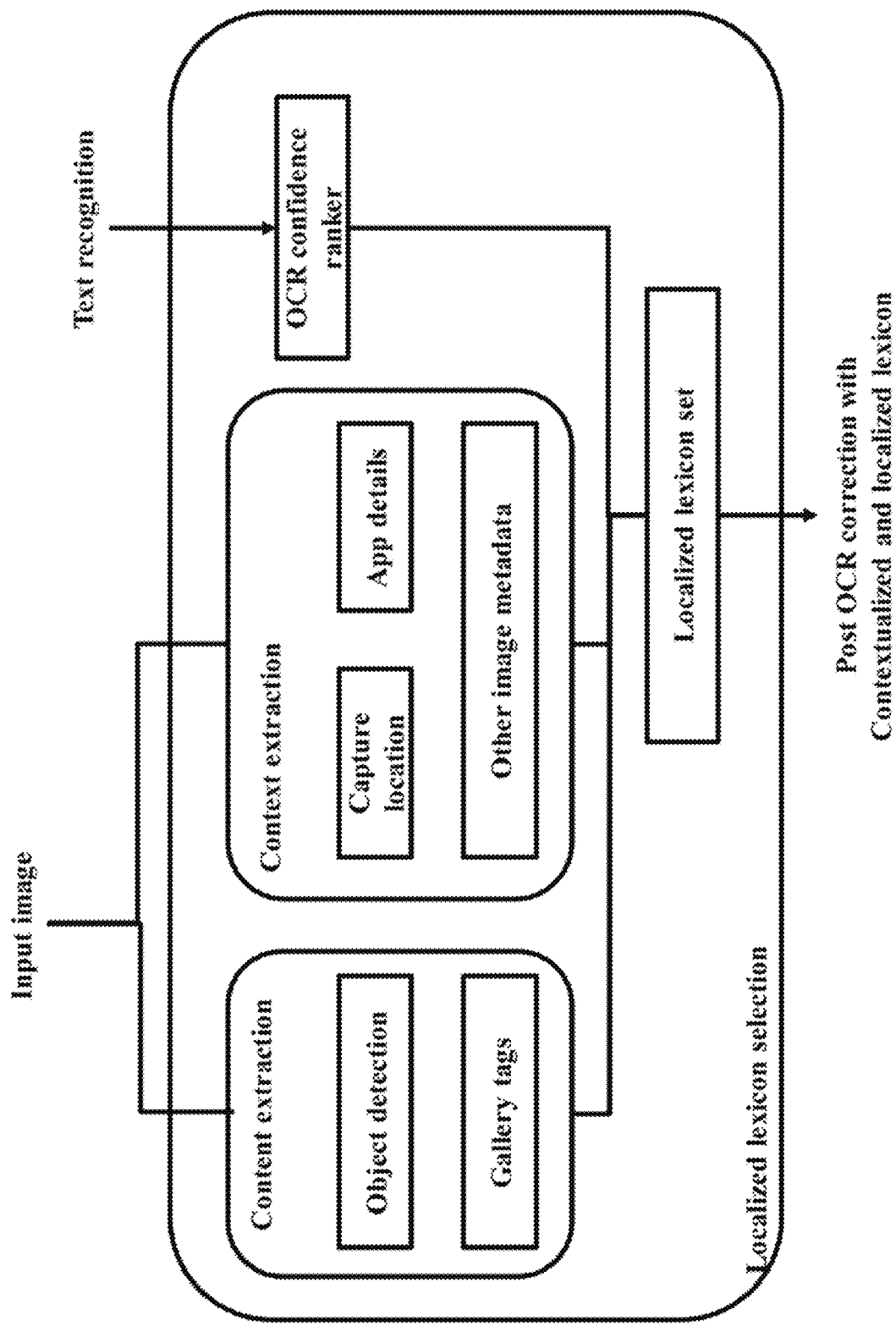
FIG. 9 is an example diagram depicting a post OCR correction performed on a first set of converted text, according to an embodiment of the disclosure.

FIG. 9 is an example diagram depicting a post OCR correction performed on a first set of converted text, according to an embodiment of the disclosure.

Referring to FIG. 9, the electronic device 200 extracts the content from the one or more blocks of the image that have to be converted into the text. The electronic device 200 may detect the objects and tags/gallery tags present in the extracted context. The electronic device 200 also may extract a context from the image to be converted into the text. The context may provide information about at least one of, but is not limited to, a capture location of the image, details of the applications used to capture/create the image, or any other metadata of the image. The electronic device 200 may also estimate the confidence value/confidence score for the text by performing the text recognition. The electronic device 200 may then create the localized lexicons based on the objects and the gallery tags present in the image, the context of the image, the confidence value, and the like. The electronic device 200 also may extract the contextual lexicons from the visual characteristics and the metadata of the image.

The electronic device 200 may then perform the OCR correction on the first set of converted text based on the contextual and localized lexicons.

FIGS. 10, 11, 12, and 13 are example diagrams depicting use scenarios of performing a post OCR correction on a first set of converted text, according to various embodiments of the disclosure.

Embodiments herein enable the electronic device 200 to perform the post OCR correction (i.e., to perform the correction on the first set of converted text) based on at least one of, the visual characteristics of the image, the contextual and localized lexicons extracted from the image, the annotation of objects present in the image, the translated text belonging to other scripts present in the one or more blocks of the image, the confidence value of the recognized marker, and the like.

Figure 10:
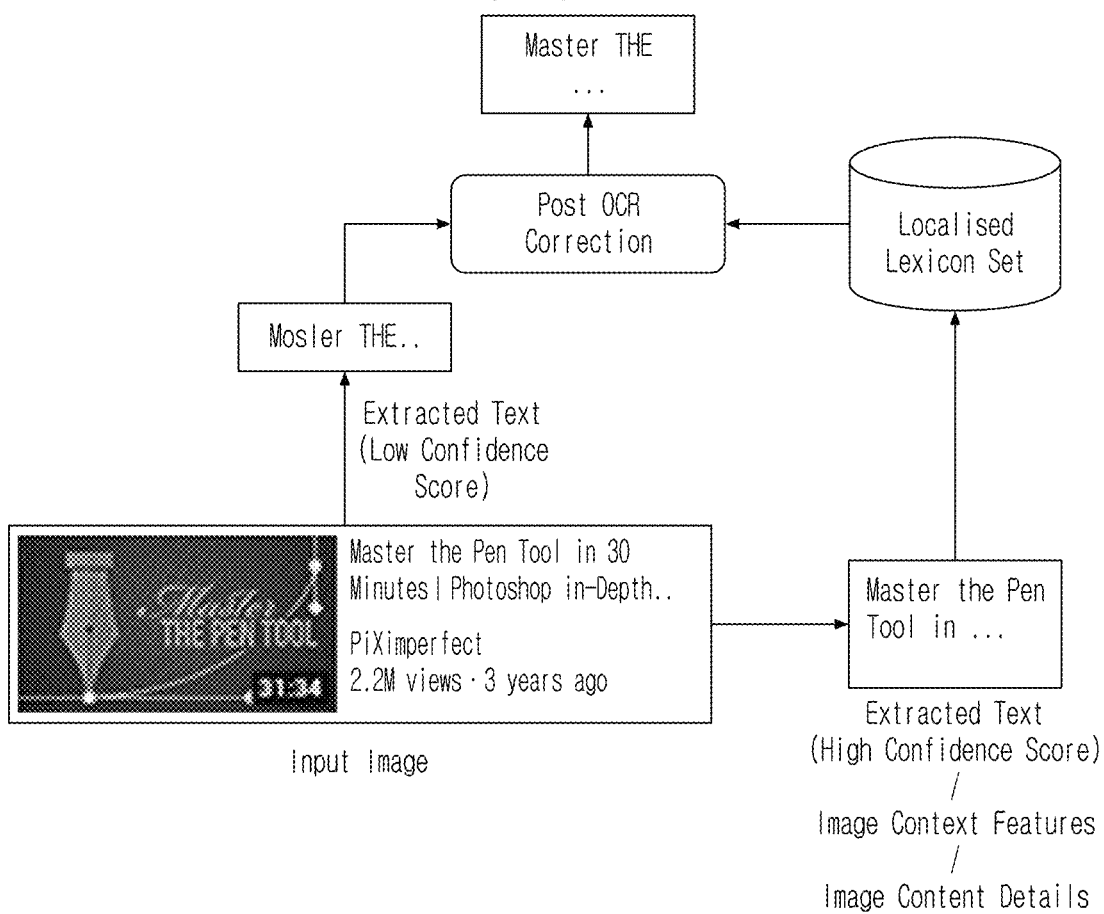
FIGS. 10, 11, 12, and 13 are example diagrams depicting use scenarios of performing a post OCR correction on a first set of converted text, according to various embodiments of the disclosure.

Referring to FIG. 10, the electronic device 200 may generate the first set of converted text as "MOSLER THE . . . " for the text in the image "Master the pen . . . ". In such a scenario, the electronic device 200 may perform the post OCR correction on the first set of converted text, as the confidence value is low. After performing the post OCR correction, the electronic device 200 may generate the text converted output.

Further, logos and signs with custom fonts may often contribute to errors while converting the image into the text. Thus, the electronic device 200 may use the text including the logos and the signs for performing the post OCR correction on the first set of converted text including complex text.

Figure 11:
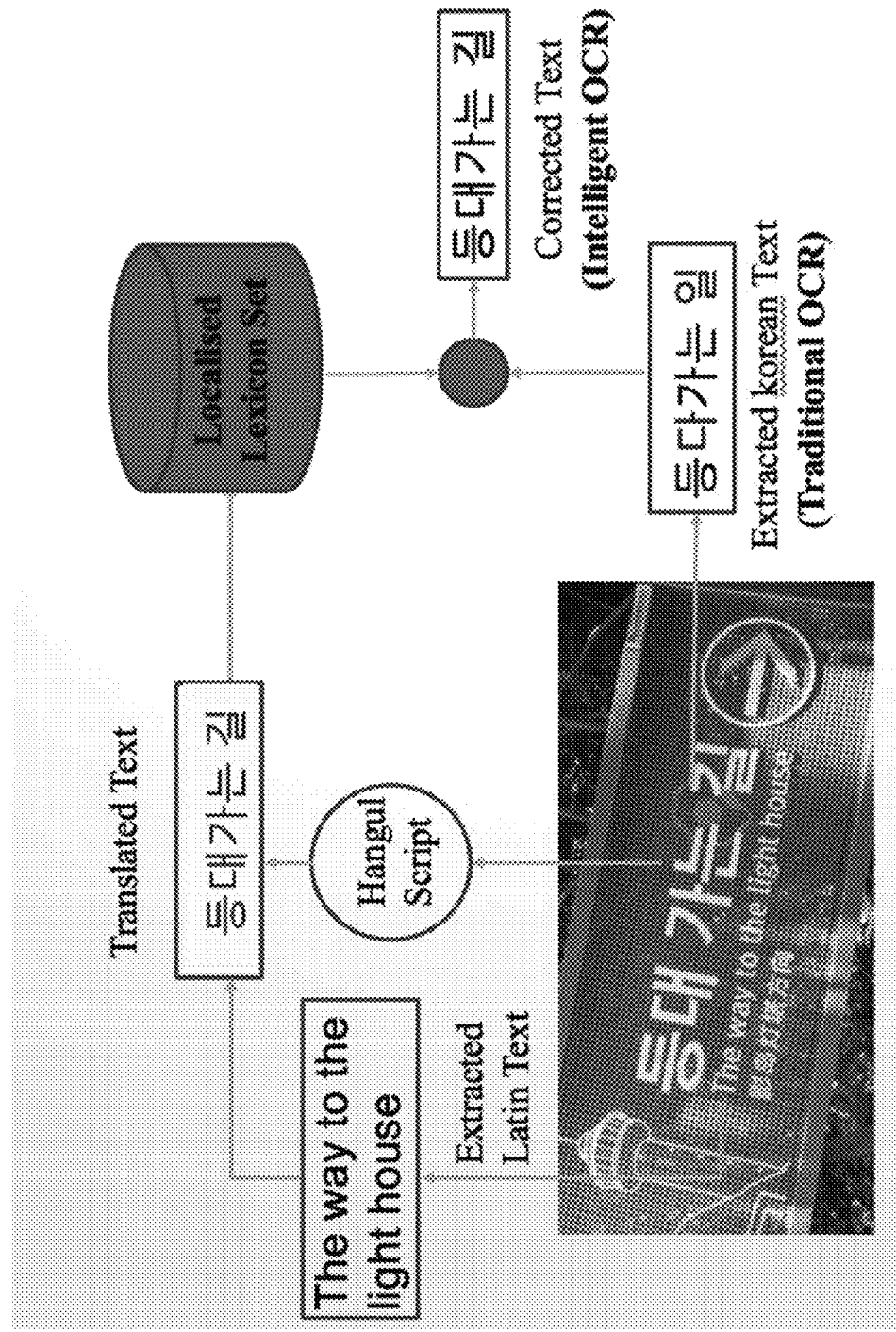

Referring to FIG. 11, the image received for the image to text conversion may include Korean text and English text. In such a scenario, the electronic device 200 may use the localized lexicons/lexicon set extracted from the clear text regions of the image to perform the post OCR correction.

Figure 12:
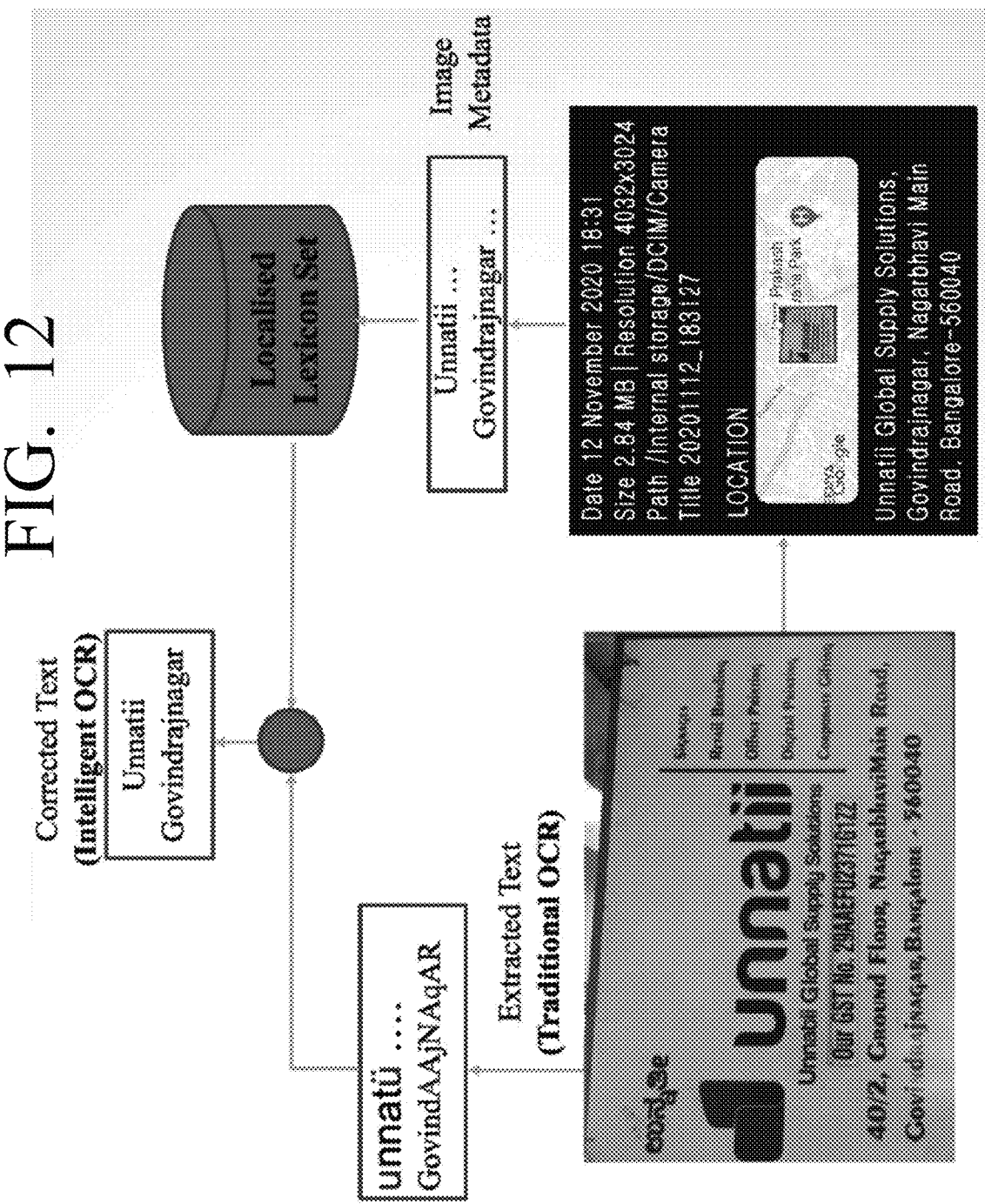

Referring to FIG. 12, the image received for the image to text conversion may include a screenshot. In such a scenario, the electronic device 200 may use the metadata of the image to perform the post OCR application. In an example herein, the metadata of the image may include at least one of, but is not limited to, a location of the image, a screenshot application, and the like.

Figure 13:
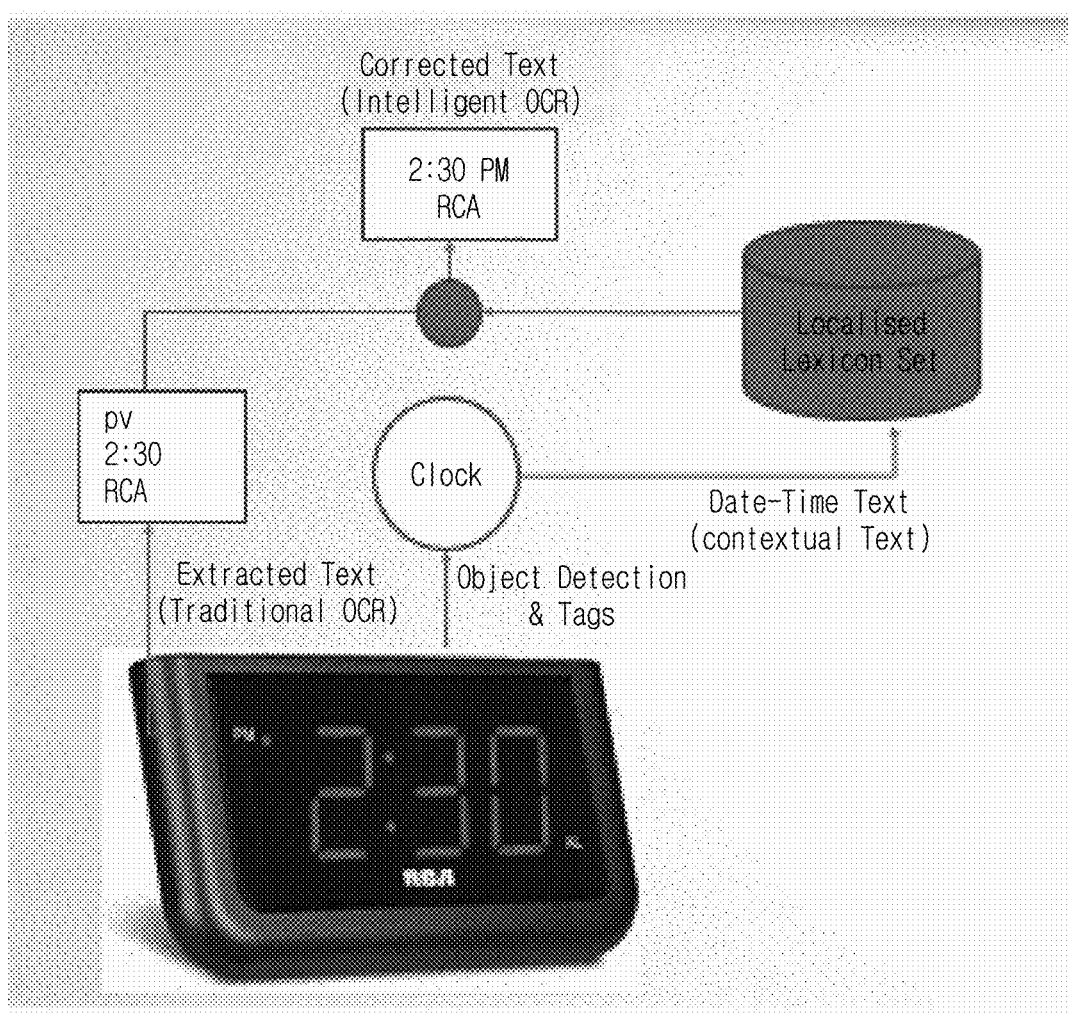

Referring to FIG. 13, wherein the image received for the image to text conversion may include a clock (i.e., an example of the objects). In such a scenario, the electronic device 200 uses the objects and the gallery tags present in the image to perform the OCR correction on the first set of converted text.

Figure 14:
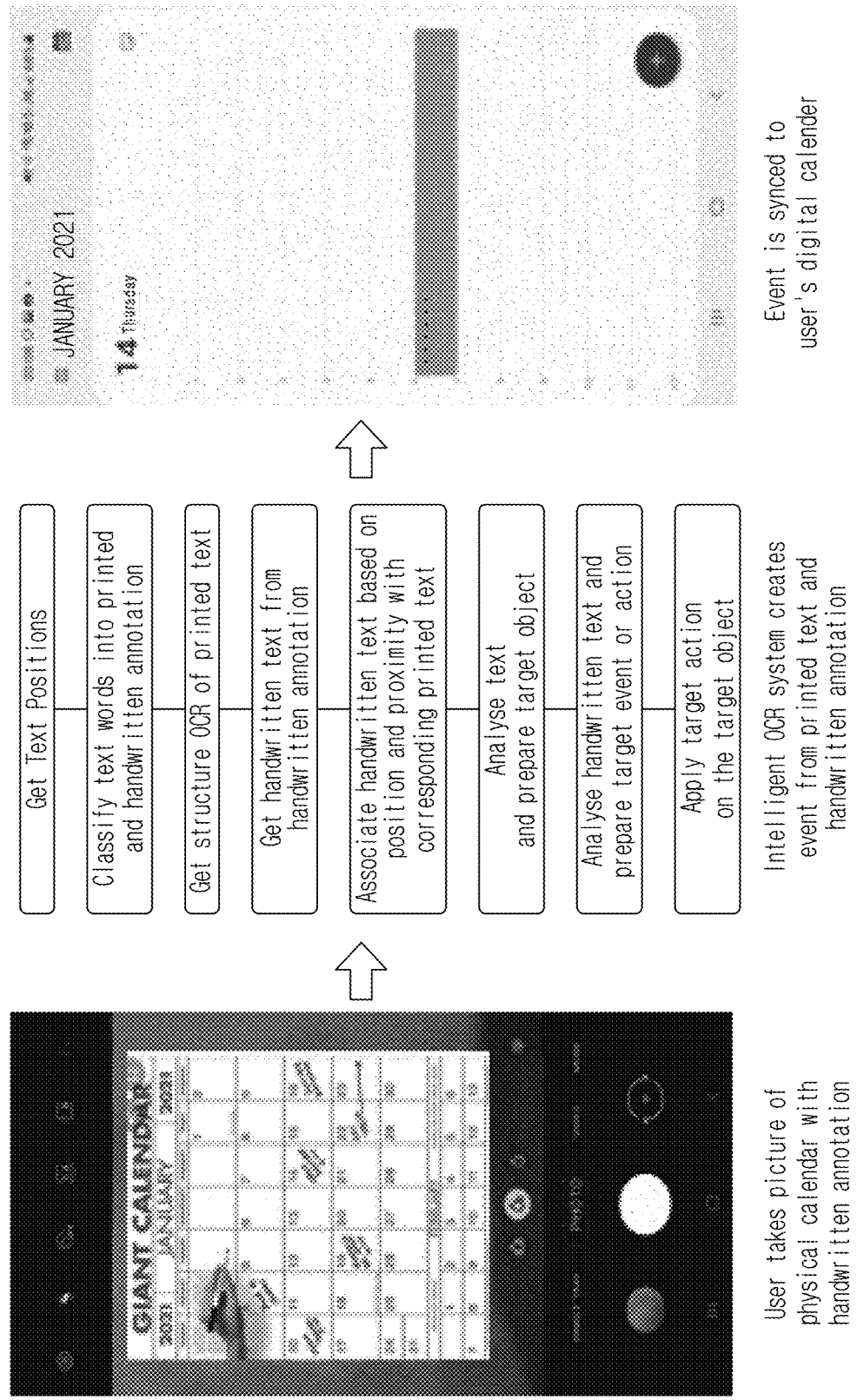
FIG. 14 is an example diagram depicting scenario of converting an image into text, the image including a handwritten annotation, according to an embodiment of the disclosure.

FIG. 14 is an example diagram depicting scenario of converting an image into text, the image including a handwritten annotation, according to an embodiment of the disclosure.

Referring to FIG. 14, the user takes a picture of a physical calendar with the handwritten annotation and provides the picture to the electronic device 200 for synching to a digital calendar of the user. In such a scenario, the electronic device 200 may obtain the positions of the text in the image. The electronic device 200 classifies the words of the text into the printed text and the handwritten annotation/text (an example of the marker). The electronic device 200 performs the OCR on the text in the image to create the first set of converted text. On creating the first set of converted text, the electronic device 200 may fetch the handwritten text from the handwritten annotation. The electronic device 200 may then associate the handwritten text with the corresponding printed text based on the position and proximity of the handwritten text with respect to the printed text.

On associating the handwritten text with the printed text, the electronic device 200 may analyze the printed text and prepares a target object. The electronic device 200 may analyze the handwritten text and prepares the target action/target event. In an example herein, the target object may be the digital calendar of the user and the target action may be synching the handwritten text present in the picture to the digital calendar of the user. On preparing the target object and the target action, the electronic device 200 may apply the target action on the target object. Thereby, synching the handwritten text to the digital calendar of the user.

Figure 15:
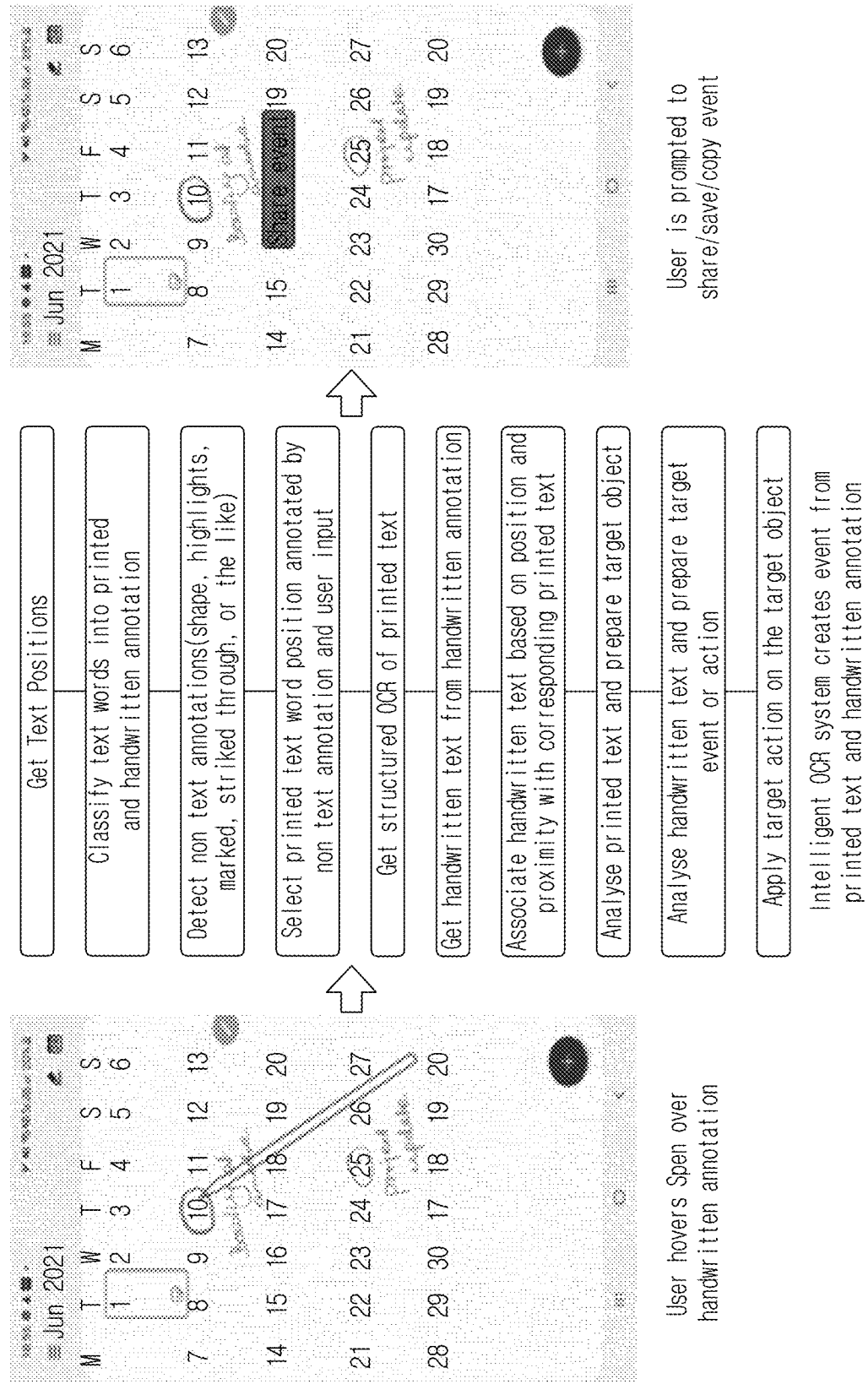
FIG. 15 is an example diagram depicting scenario of converting an image into text, the image including the handwritten annotation and a non-text annotation, according to an embodiment of the disclosure.

FIG. 15 is an example diagram depicting scenario of converting an image into text, the image including a handwritten annotation and a non-text annotation, according to an embodiment of the disclosure.

Referring to FIG. 15, the user hovers an S-pen over the handwritten annotation present in the image. In such a scenario, the electronic device 200 may obtain the positions of the text in the image. The electronic device 200 may classify the words of the text into the printed text and the handwritten annotation/text (an example of the marker). The electronic device 200 also may detect the non-text annotations (for example, a shape, a highlight, a marked text, a stricken through, and the like). On detecting the non-text annotations, the electronic device 200 may select the printed text word position annotated by the non-text annotation and the user input (i.e., the hover gesture performed by the user). The electronic device 200 may perform the OCR on the text in the image to create the first set of converted text.

On creating the first set of converted text, the electronic device 200 may fetch the handwritten text from the handwritten annotation. The electronic device 200 may then associate the handwritten text with the corresponding printed text based on the position and proximity of the handwritten text with respect to the printed text.

On associating the handwritten text with the printed text, the electronic device 200 may analyze the printed text and prepares a target object. The electronic device 200 may analyze the handwritten text and prepares the target action/target event. In an example herein, the target object may be a memory location in which the user wants to save the handwritten text or the at least one external entity with which the user wants to share the handwritten text. In an example herein, the target action may be saving/copying/sharing the handwritten text. On preparing the target object and the target action, the electronic device 200 may apply the target action on the target object. Thereby, saving/copying/sharing the event/handwritten text.

Figure 16:
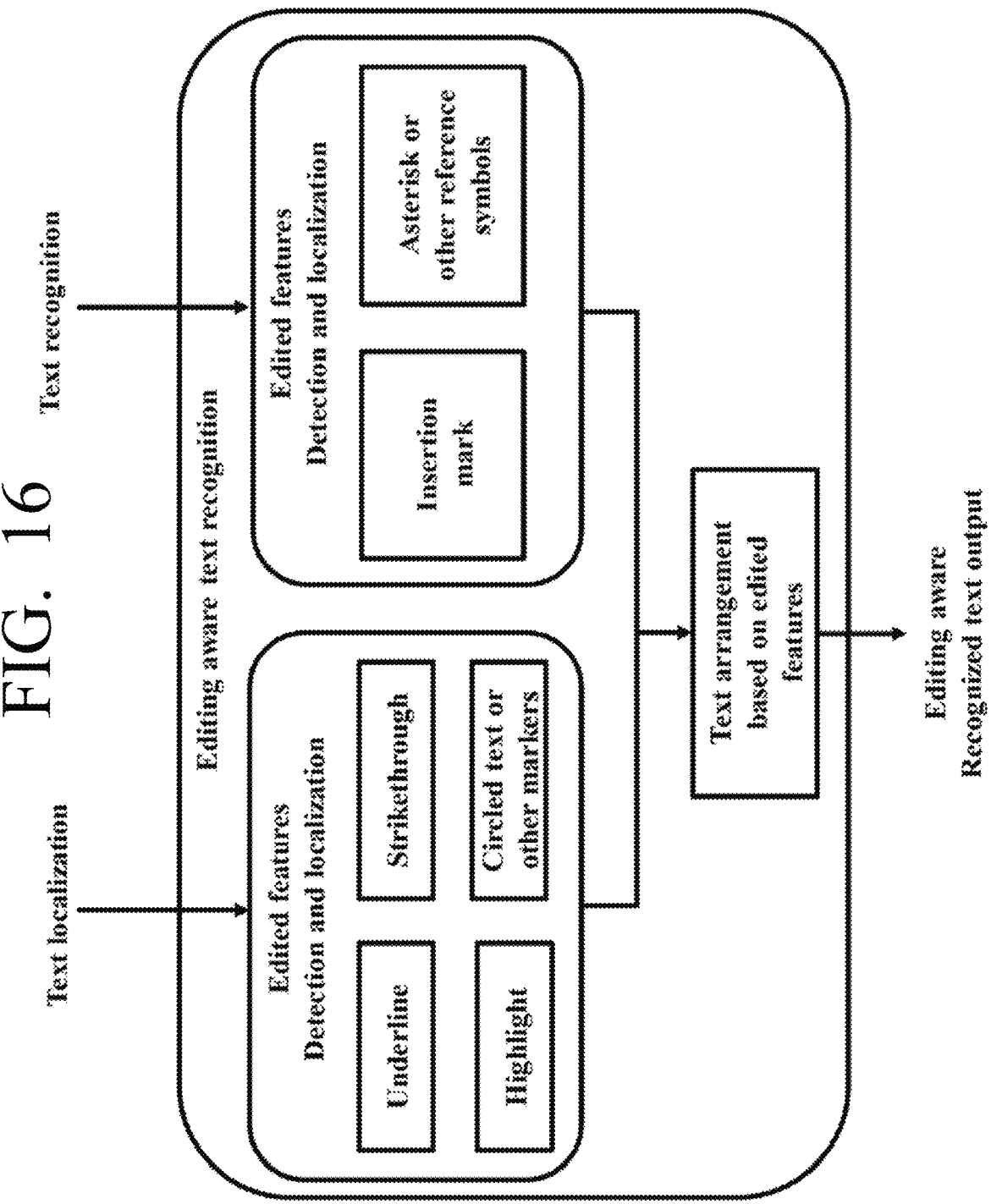
FIG. 16 is an example diagram depicting conversion of the image into the text, the image including user edited segments, according to an embodiment of the disclosure.

FIG. 16 is an example diagram depicting conversion of an image into text, the image including user edited segments, according to an embodiment of the disclosure.

Referring to FIG. 16, the electronic device 200 may perform text recognition to recognize the edit symbols such as, but are not limited to, an insertion mark, an asterisk symbol, or any other reference symbols. The electronic device 200 also may perform the text localization to detect the user edited segments such as, but are not limited to, an underline, a strikethrough, a highlight, a circled text, or any other markers. Based on the detected user edited segments and the edit symbols, the electronic device 200 may prepare the edit action to modify/rearrange the text based on the user edited segments and the edit symbols. The electronic device 200 may apply the target action on the first set of converted text to generate the text converted output.

Figure 17:
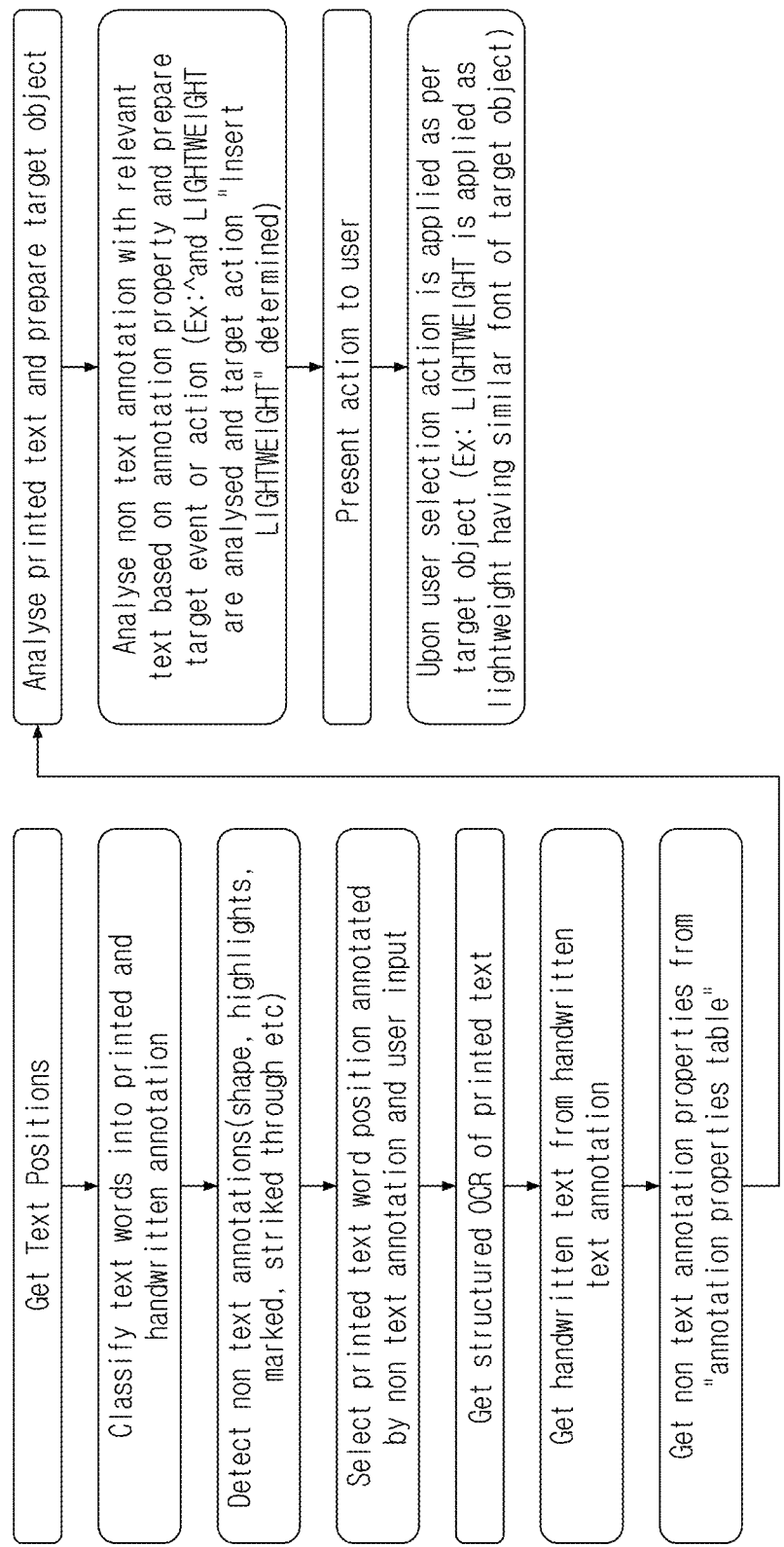
FIG. 17 is an example diagram depicting converting an image into text based on non-text annotations, according to an embodiment of the disclosure.

FIG. 17 is an example diagram depicting converting an image into text based on non-text annotations, according to an embodiment of the disclosure.

Referring to FIG. 17, the electronic device 200 may obtain the positions of the text in the image. The electronic device 200 classifies the words of the text into the printed text and the handwritten annotation/text (an example of the marker). The electronic device 200 may also detect the non-text annotations (for example, a shape, a highlight, a marked text, a strike through, and the like). On detecting the non-text annotations, the electronic device 200 may select the printed text word position annotated by the non-text annotation and the user input. The electronic device 200 may perform the OCR on the text in the image to create the first set of converted text.

FIGS. 18A, 18B, and 18C depict non-text annotation properties tables, according to various embodiments of the disclosure.

Referring to FIGS. 18A to 18C, the electronic device 200 may fetch the handwritten text from the handwritten annotation. The electronic device 200 may then obtain the non-text annotation properties from the annotation properties table.

Once the non-text annotation properties have been obtained, the electronic device 200 may analyze the printed text and prepares the target object. The electronic device 200 may analyze the non-text annotation with the relevant text based on the extracted non-annotation properties to prepare the target action. For example, the electronic device 200 analyzes the non-text annotation '^' and the handwritten text "LIGHTWEIGHT" and prepares the target action to insert the handwritten text "LIGHTWEIGHT".

The electronic device 200 also may present the prepared target action to the user. Upon the user selection, the electronic device 200 may apply the target action on the target object. For example, the electronic device 200 applies the handwritten text "LIGHTWEIGHT" as lightweight having similar font of the target object.

Figure 19:
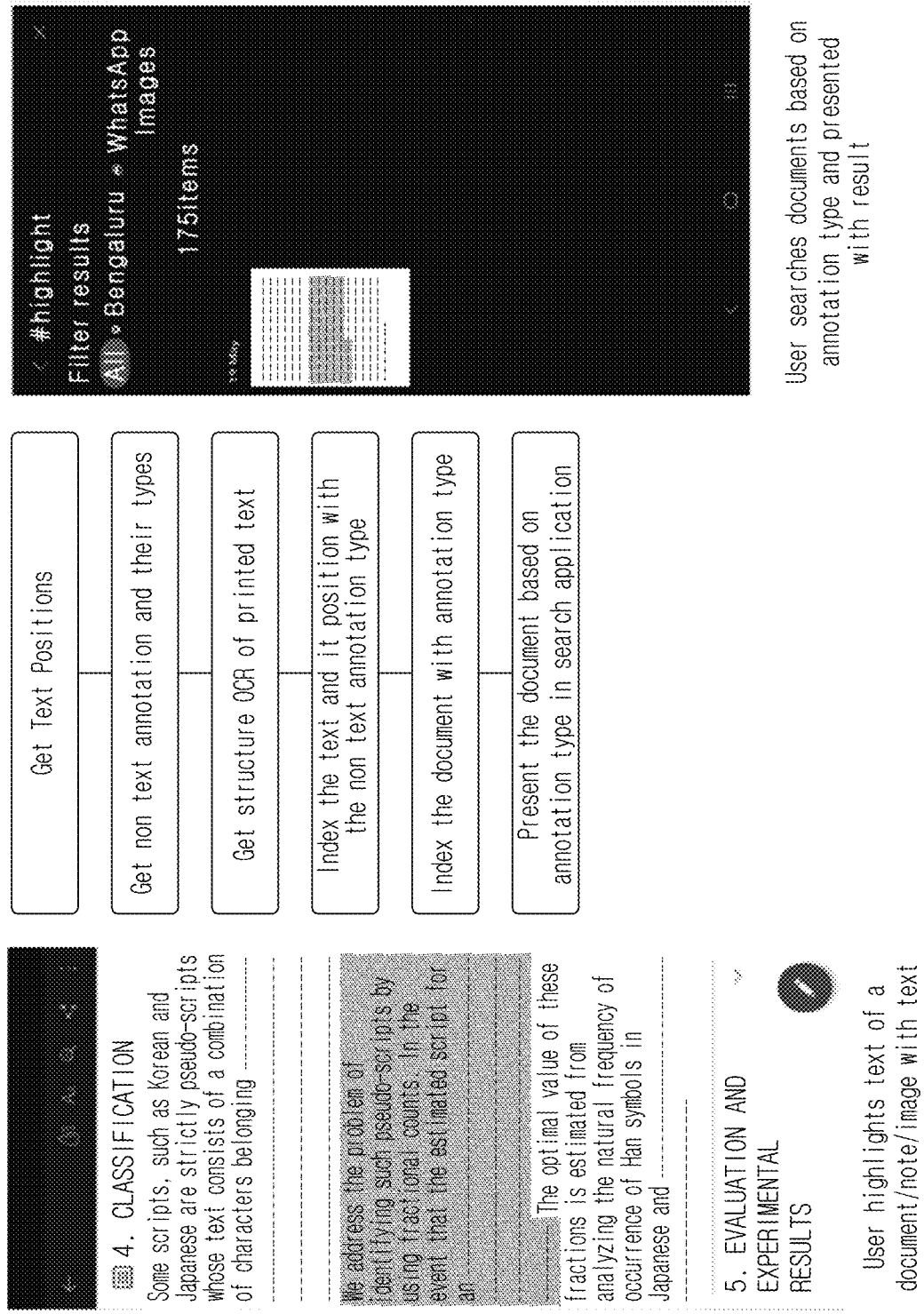
FIG. 19 is an example diagram depicting performing of an annotation type search, according to an embodiment of the disclosure.

FIG. 19 is an example diagram depicting performing of an annotation type search, according to an embodiment of the disclosure.

Referring to FIG. 19, the user highlights the text of a document/note/image. In such a scenario, the electronic device 200 may detect the positions of the text in the image. The electronic device 200 may obtain the non-text annotation and the associated type (for example, encircled, highlighted, marked, caret, strikethrough, and the like). On obtaining the non-text annotation, the electronic device 200 may perform the OCR on the image to create the first set of converted text. On creating the first set of converted text, the electronic device 200 may index the text of the image and the associated position with the non-text annotation type. The electronic device 200 also may index the image/document with the non-text annotation type. The electronic device 200 then may present the image/document based on the non-text annotation type in the search application. Thus, while the user is searching, the image/document with the annotation type may be presented to the user.

Figure 20:
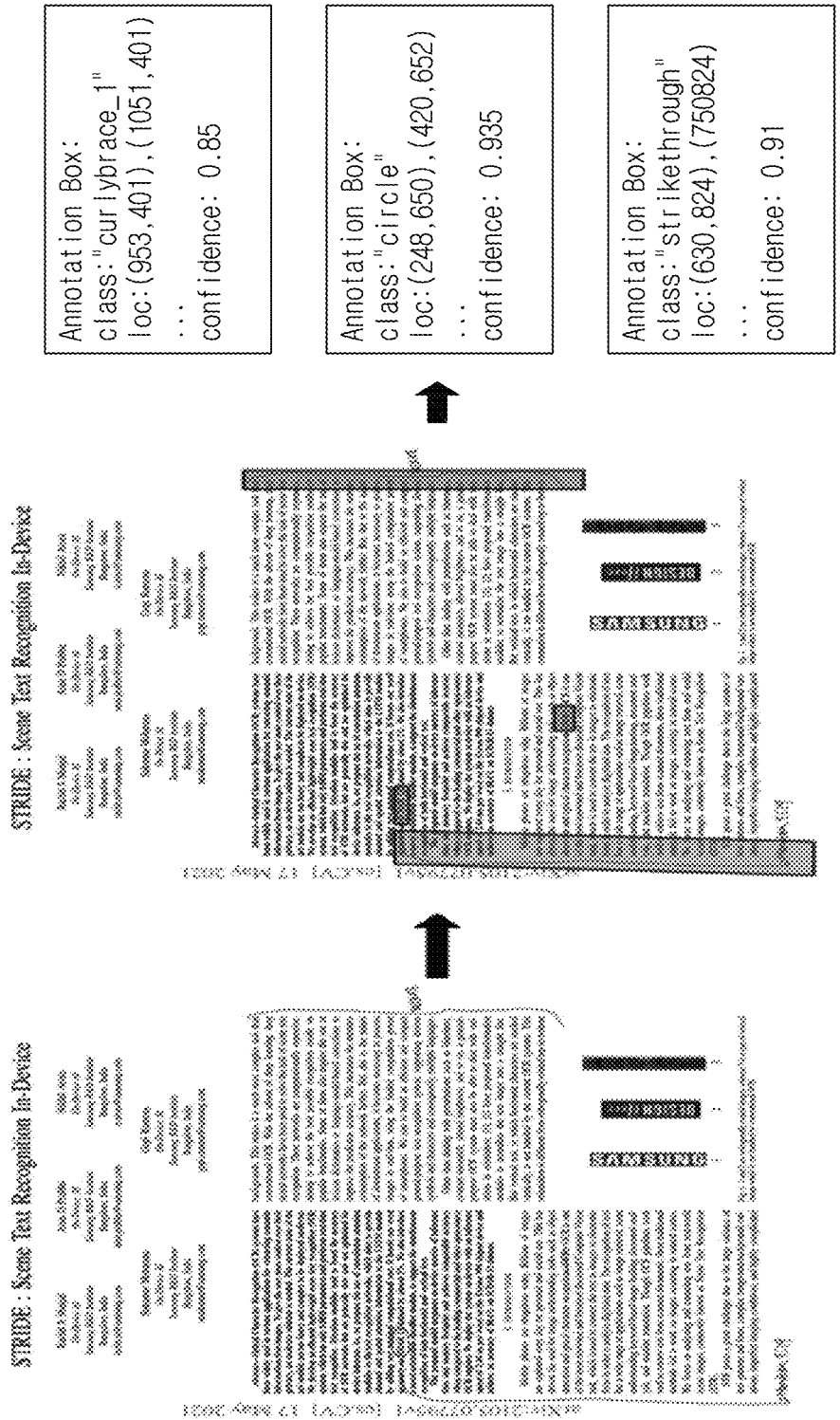
FIG. 20 is an example diagram depicting recognition of a non-text annotation and an associated category, according to an embodiment of the disclosure.

FIG. 20 is an example diagram depicting recognition of a non-text annotation and an associated category, according to an embodiment of the disclosure.

Referring to FIG. 20, the electronic device 200 may train the second neural network 304 to segment the image into the foreground non-text annotation map and the background image. The electronic device 200 then may threshold the foreground non-text annotation map and applies the connected component analysis on the thresholded foreground non-text annotation map to recognize the at least one non-text annotation and the associated position in the at least one block of the image including the content to be converted into the text.

The electronic device 200 may crop the recognized the at least one non-text annotation from the at least one block and processes the cropped at least one non-text annotation using the third neural network 306 to determine the category of the recognized at least one non-text annotation with the confidence value.

FIG. 21 is an example diagram depicting PDF editing in a smart note application, according to an embodiment of the disclosure.

Referring to FIG. 21, the user attaches a PDF to the note application on the electronic device 200 and selects a "smart edit" option. In such a scenario, upon touching the annotation, the user may be presented with an option to apply annotation. Once the user selects the option to apply annotation, the electronic device 200 may apply the annotation as per the property of the printed text.

Figure 22:
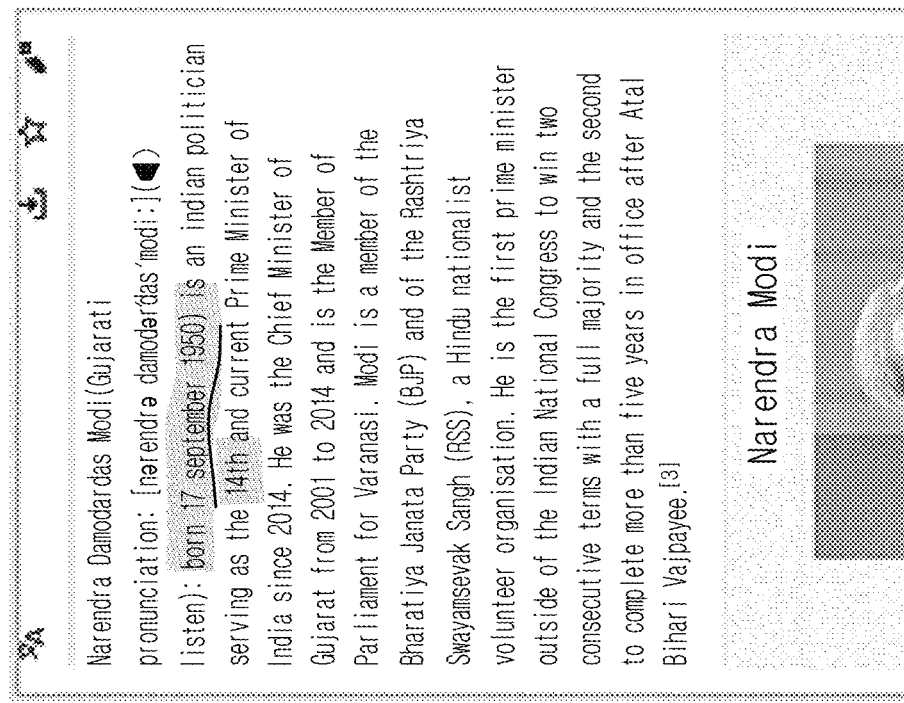
FIG. 22 is an example diagram depicting conversion of an image into text by determining underlined/highlighted text, according to an embodiment of the disclosure.

FIG. 22 is an example diagram depicting conversion of an image into text by determining underlined/highlighted text, according to an embodiment of the disclosure.

Referring to FIG. 22, the user highlights the text in an edited screenshot/document (an example of the image). In such a scenario, existing OCR solutions generates the text converted output by ignoring the highlights on the text. In contrast, embodiments herein enable the electronic device 200 to generate the text converted output by determining the highlighted text.

Figure 23:
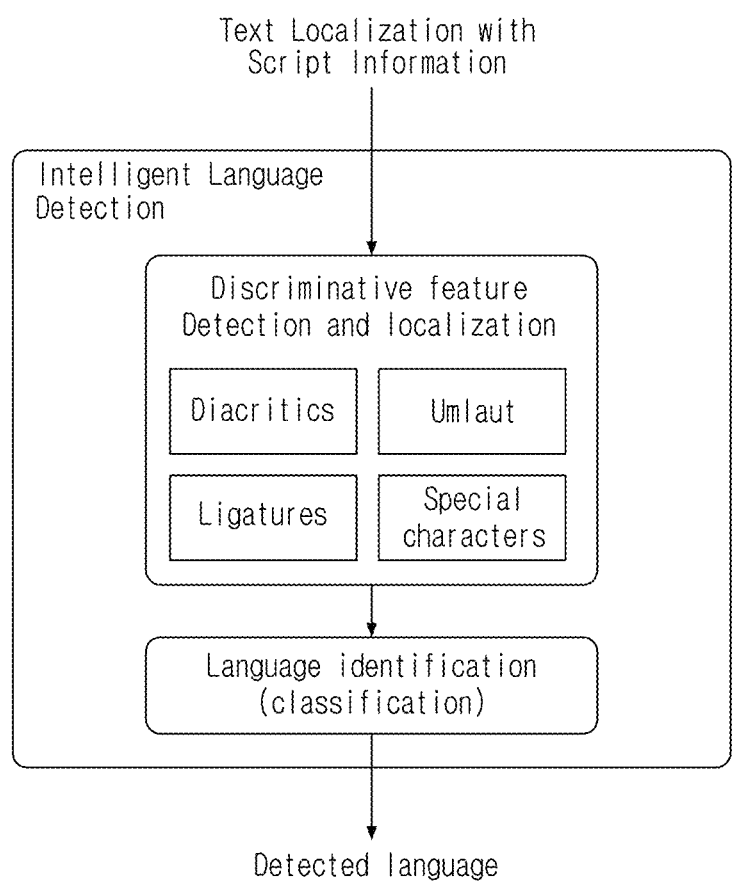
FIGS. 23 and 24 are example diagrams depicting detection of a language of text present in an image, according to various embodiments of the disclosure.
Figure 24:
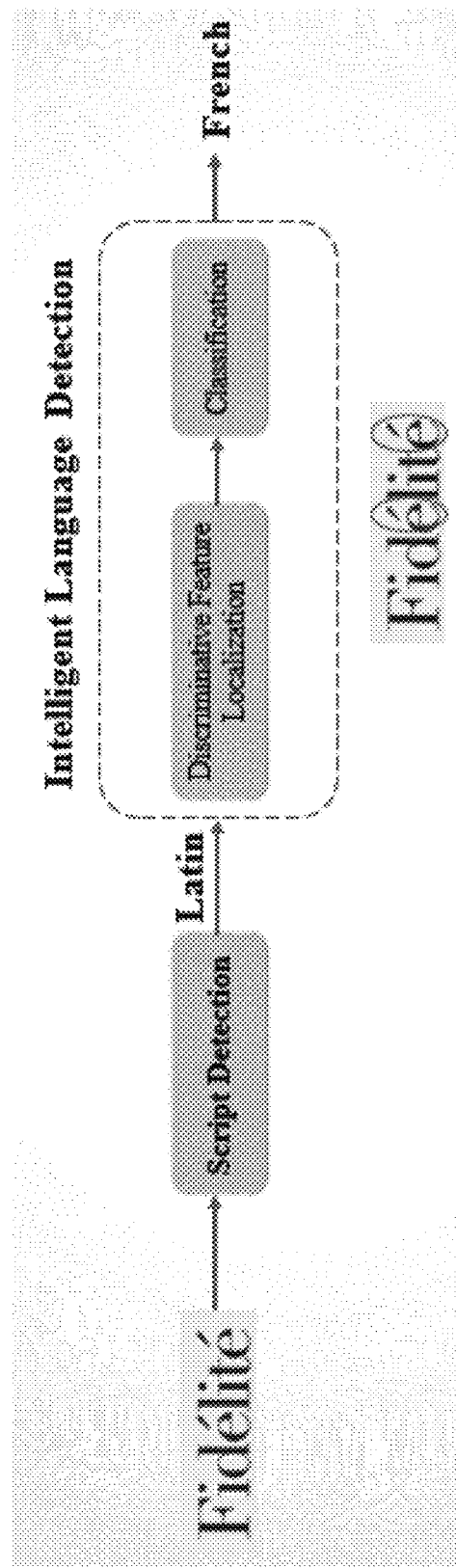

FIGS. 23 and 24 are example diagrams depicting detection of a language of text present in an image, according to various embodiments of the disclosure.

FIG. 25 depicts details of discriminative features associated with the words of the text in the image, according to an embodiment of the disclosure.

Referring to FIGS. 23-24, the electronic device 200 may perform text localization and detect the scripts of the words of the text present in the image. On detecting the scripts of the words, the electronic device 200 may detect the presence of discriminative features associated with each word. The discriminative features include at least one of, the diacritics, the umlaut, the special characters, the ligatures, or the like. Details of the discriminative features are depicted in FIG. 25.

The electronic device 200 then may determine the language of each word of the text based on the detected discriminative features and the NLP of the words of the text.

Using the above described method for detecting the language of the text may eliminate a need for performing the OCR with all the scripts. Thus, the time may be saved and also an accuracy may be improved since the diacritics are known due to the correct language.

Figure 26:
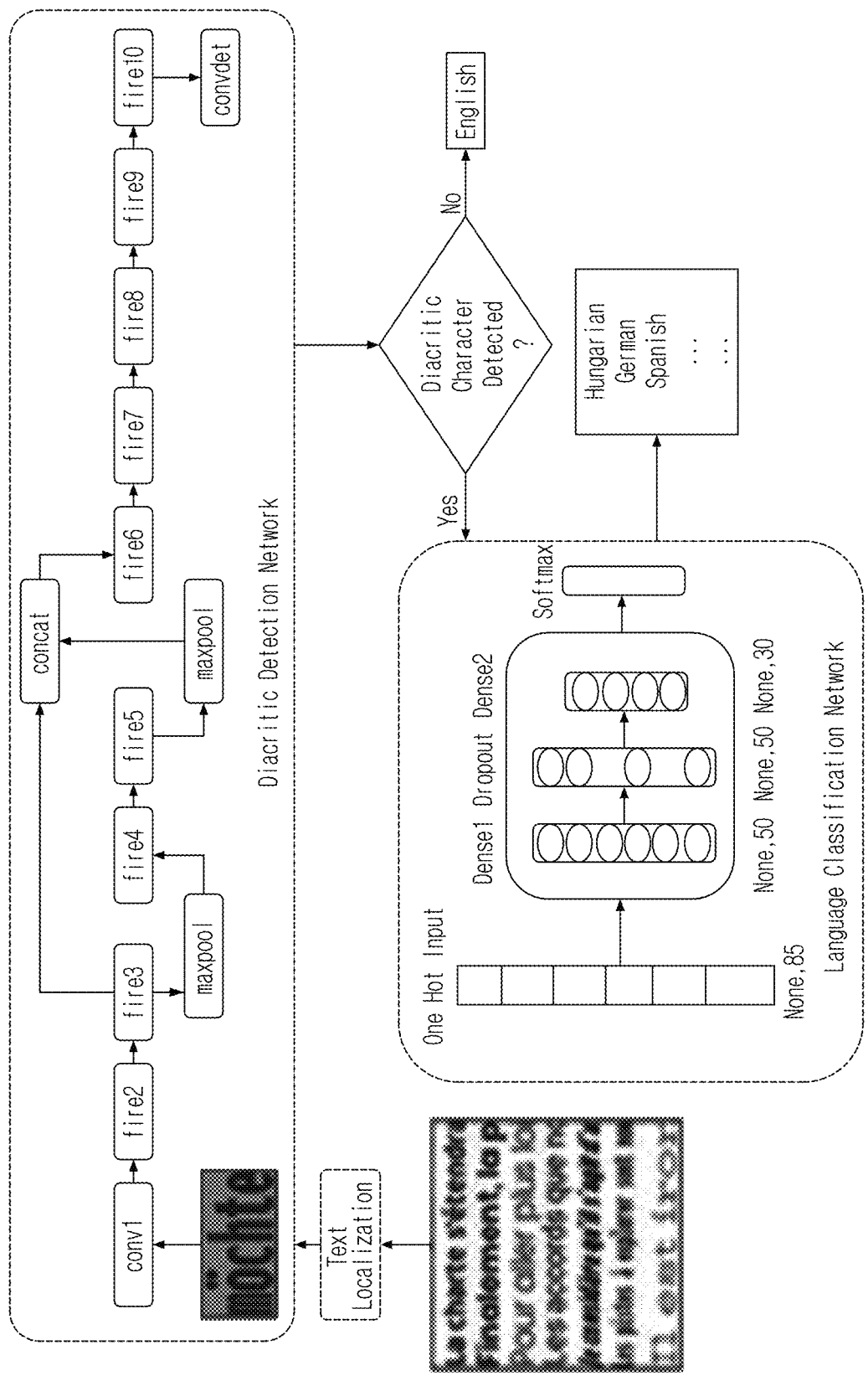
FIG. 26 is an example diagram depicting detection of diacritics and accordingly classifying a language of text present in an image, according to an embodiment of the disclosure.

FIG. 26 is an example diagram depicting detection of diacritics and accordingly classifying a language of text present in an image, according to an embodiment of the disclosure.

Referring to FIG. 26, the electronic device 200 detect the scripts of the words of the text present in the image. On detecting the scripts of the words, the electronic device 200 may feed the detected scripts of the words of the text to a diacritic detection network. The diacritic detection network processes the scripts of the words of the text and generates an output. The output generated by the diacritic detection network depicts if the diacritics/diacritics character is associated with the text present in the image or not.

Based on the output generated by the diacritic detection network, the electronic device 200 may check if the diacritics/diacritics character is associated with the text present in the image or not. If the diacritics/diacritics character is not associated with the text present in the image, the electronic device 200 may detect the language of the text present in the image as English. If the diacritics/diacritics character is associated with the text present in the image, the electronic device 200 may use a language classification network to classify the language of the text present in the image (i.e., to determine the language of the text) into at least one of, but is not limited to, Hungarian, German, Spanish, and the like. A function of the diacritic detection network and the language classification network may be intuitively inferred by one of ordinary skill in the art based on its name, and thus, its detailed description is omitted.

Figure 27:
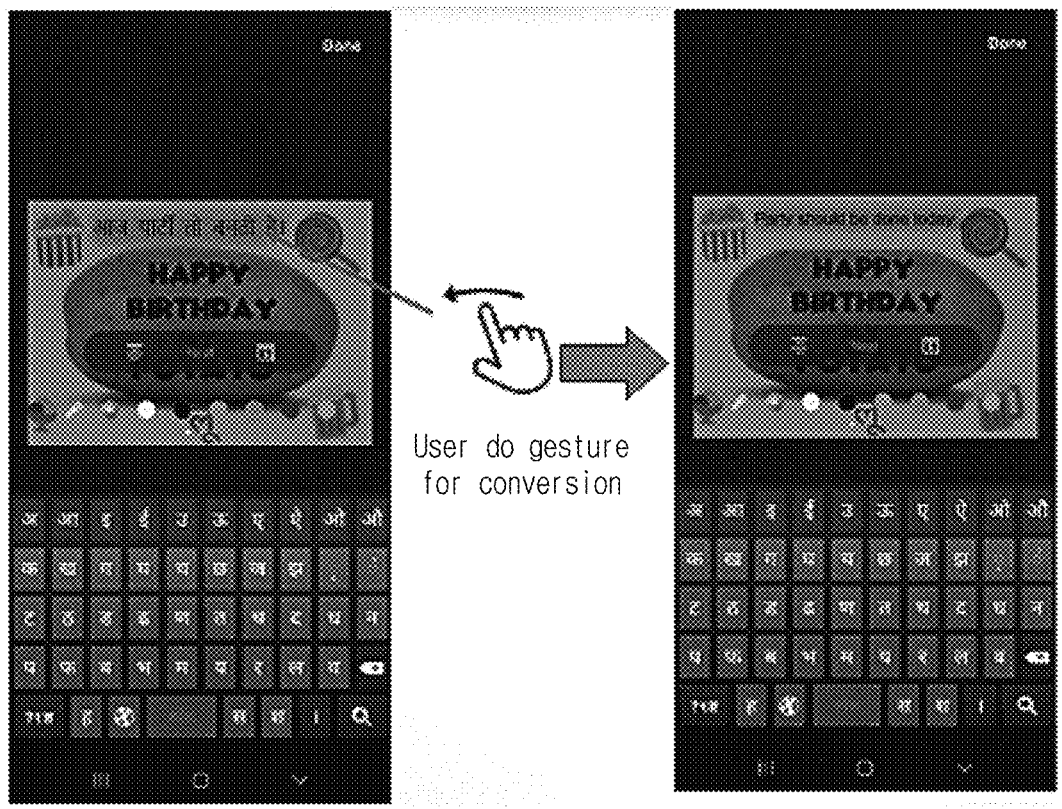
FIG. 27 is an example diagram depicting transition of text from one language to another language, according to an embodiment of the disclosure.

FIG. 27 is an example diagram depicting transition of the text from one language to another language, according to an embodiment of the disclosure.

Referring to FIG. 27, the user adds text in a comfort language in a photo editing application and performs a gesture for the language transition. In such a scenario, the electronic device 200 may translate the text to English as the electronic device 200 may determine that the other language present in the image as English.

Figure 28:
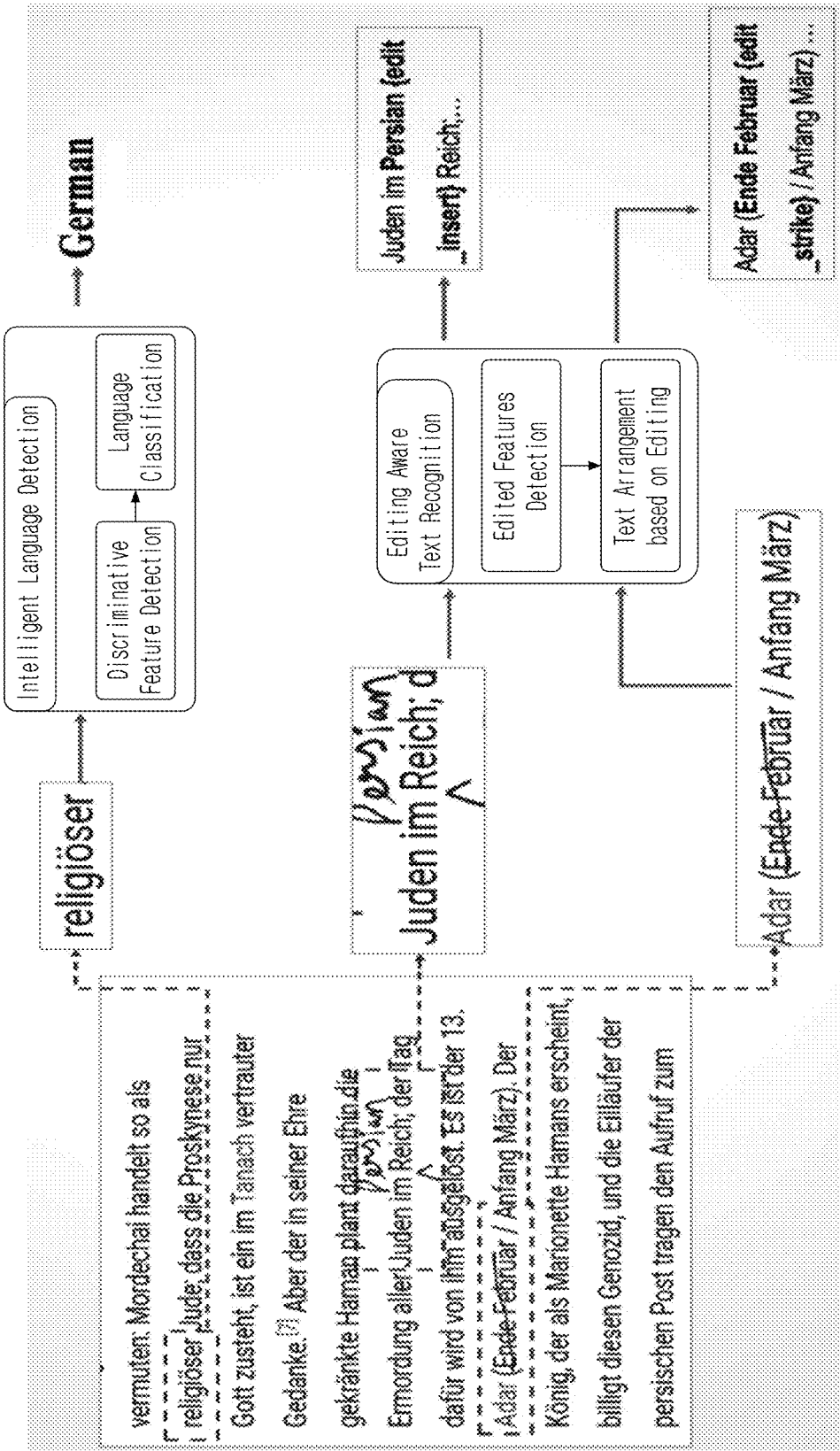
FIG. 28 is an example diagram depicting an image to text conversion, according to an embodiment of the disclosure.

FIG. 28 is an example diagram depicting the image to text conversion, according to an embodiment of the disclosure.

Embodiments herein enable the electronic device 200 to convert the image into the text by determining the language of the text present in the image and detecting the one or more markers present in the one or more blocks of the image that have to be converted into the text.

Referring to FIG. 28, the electronic device 200 may receive an exemplary image to be converted into the text. For converting the image into the text, the electronic device 200 may determine the language of the text present in the image based on the scripts of the at least one word present in the text (for example, a word "religioser") and the associated discriminative features, and the NLP of each word. In an example herein, the electronic device 200 may determine the language of the text present in the image is German.

Further, the electronic device 200 may recognize the user edited segments (examples of the markers) in the content of the one or more blocks of the image. In example herein, the user edited segments may indicate to add a word "Persian" between "Juden im" and "Reich" and to strike a word "Ende Februar". On recognizing the user edited segments, the electronic device 200 may perform the OCR on the blocks of the image to generate the first set of converted text based on the recognized user edited segments. The electronic device 200 may prepare the edit action to add the word "Persian" between "Juden im" and "Reich" (i.e., "Juden im Persian {edit_insert} Reich; . . . ") and to strike the word "Ende Februar". (i.e., "Adar (Ende Februar {edit_strike}/ Anfang März) . . . ".). The electronic device 200 may apply the edit action on the first set of converted text to generate the text converted output. The text converted output includes the word "Persian" added between "Juden im" and "Reich" and an absence of the word "Ende Februar".

FIGS. 29 through 38 are example diagrams depicting an on-device image to text conversion with an improved accuracy, according to various embodiments of the disclosure.

Figure 29:
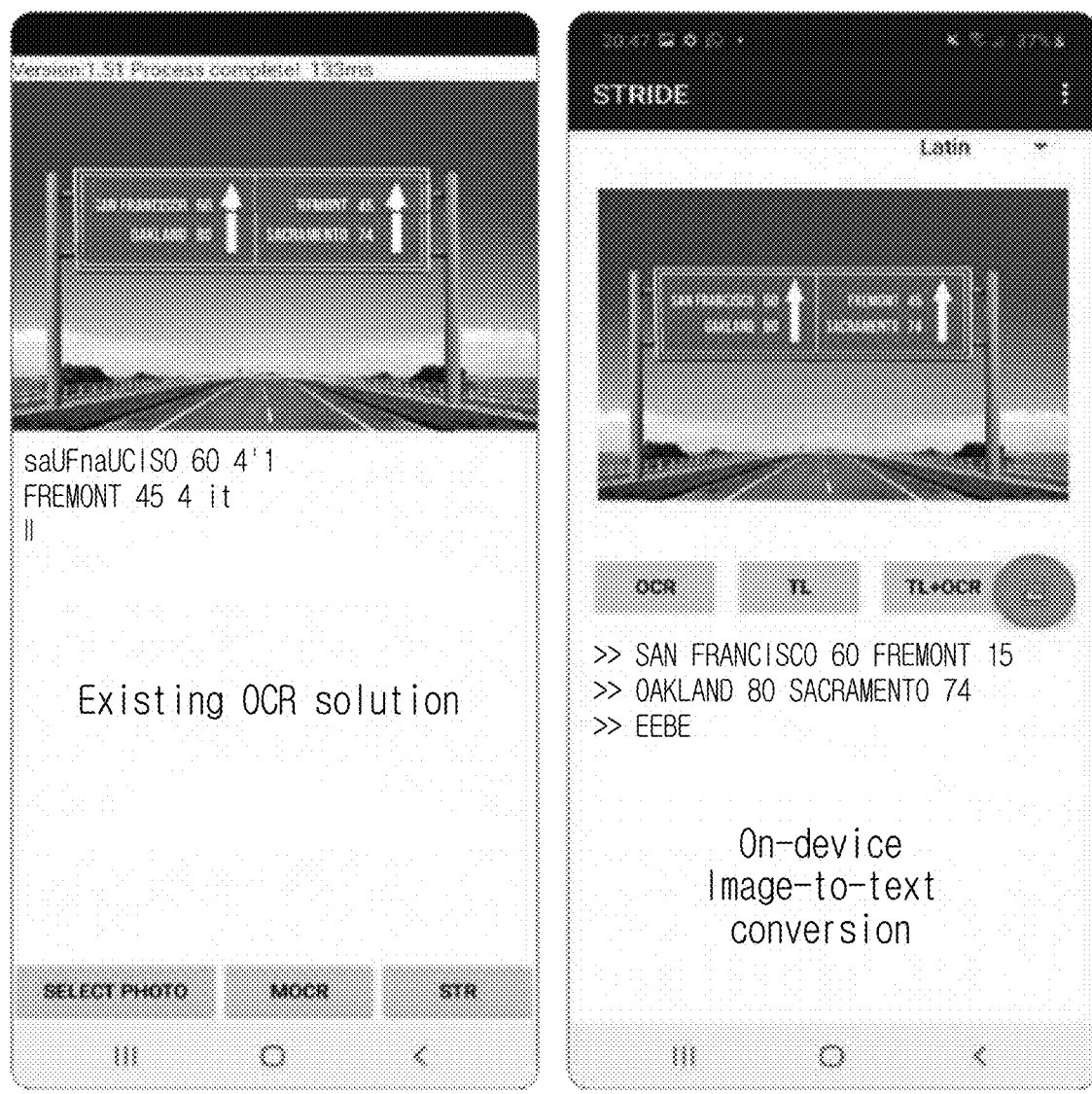
FIGS. 29, 30, 31, 32, 33, 34, 35, 36, 37, and 38 are example diagrams depicting an on-device image to text conversion with an improved accuracy, according to various embodiments of the disclosure.

FIG. 29 illustrates the image including a scene is converted into text, according to an embodiment of the disclosure.

Figure 30:
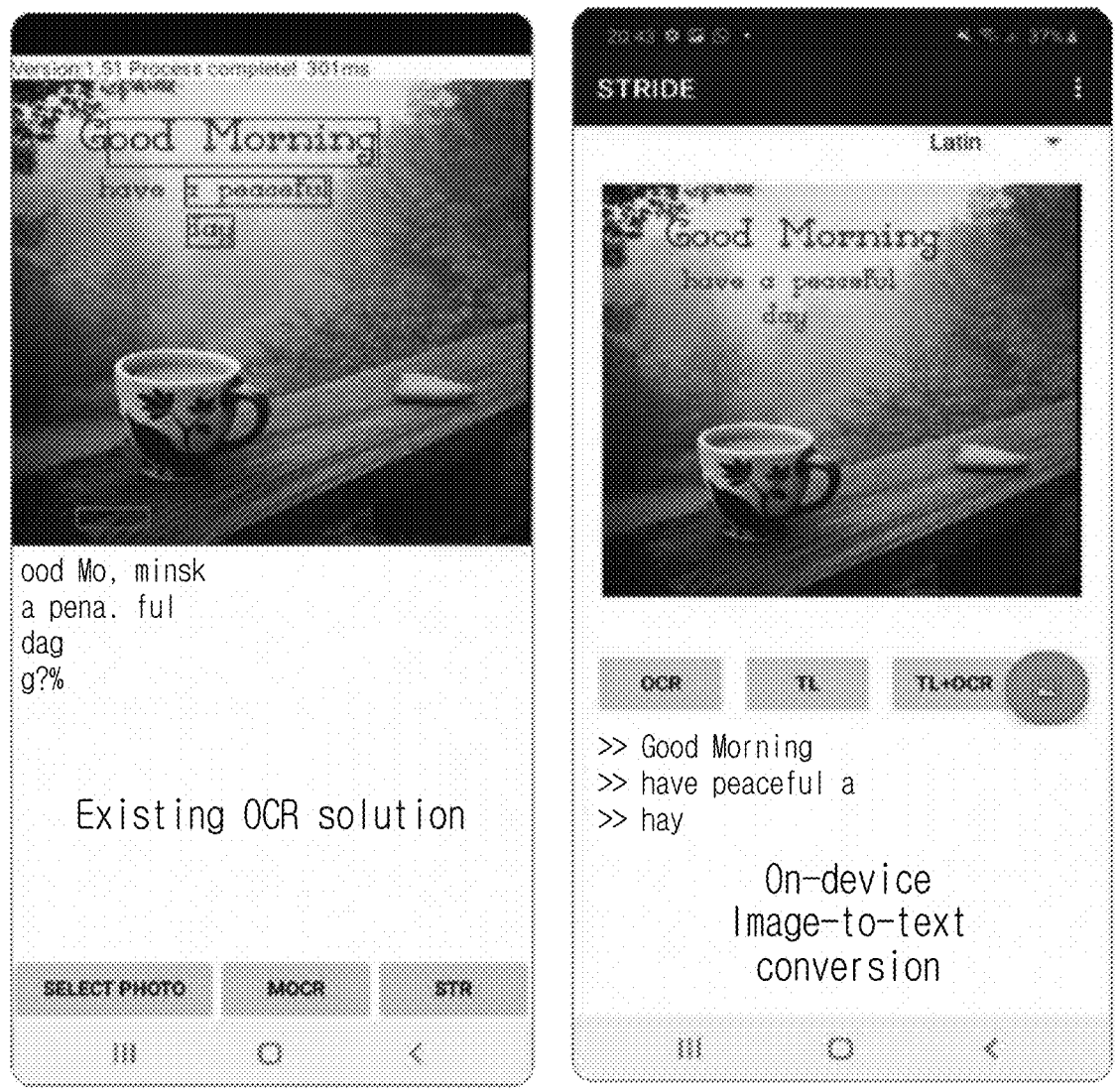

FIG. 30 illustrates the image including a graphic is converted the text, according to an embodiment of the disclosure.

Figure 31:
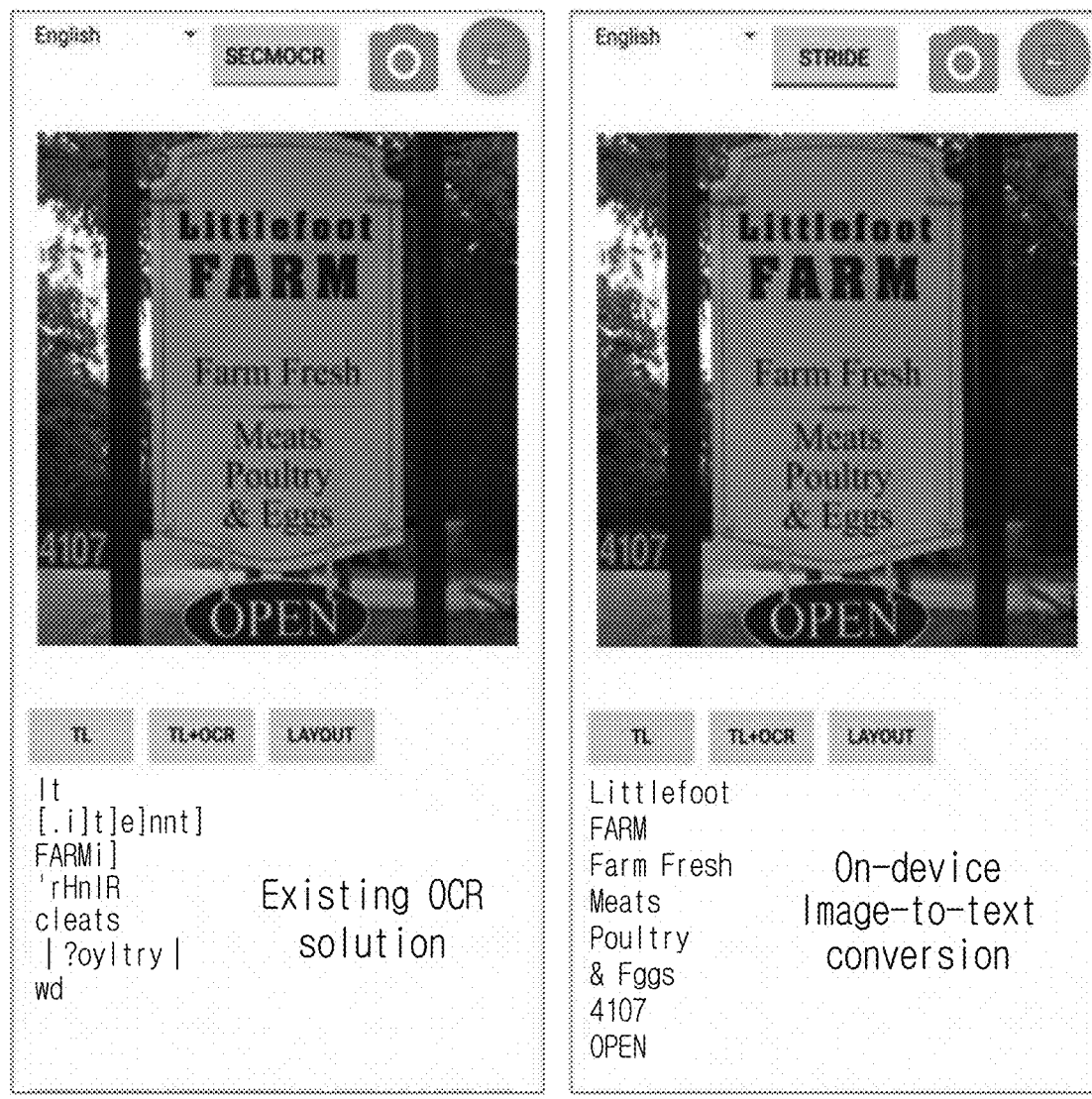

FIG. 31 illustrates the image including a scene text is converted into text, according to an embodiment of the disclosure.

Figure 32:
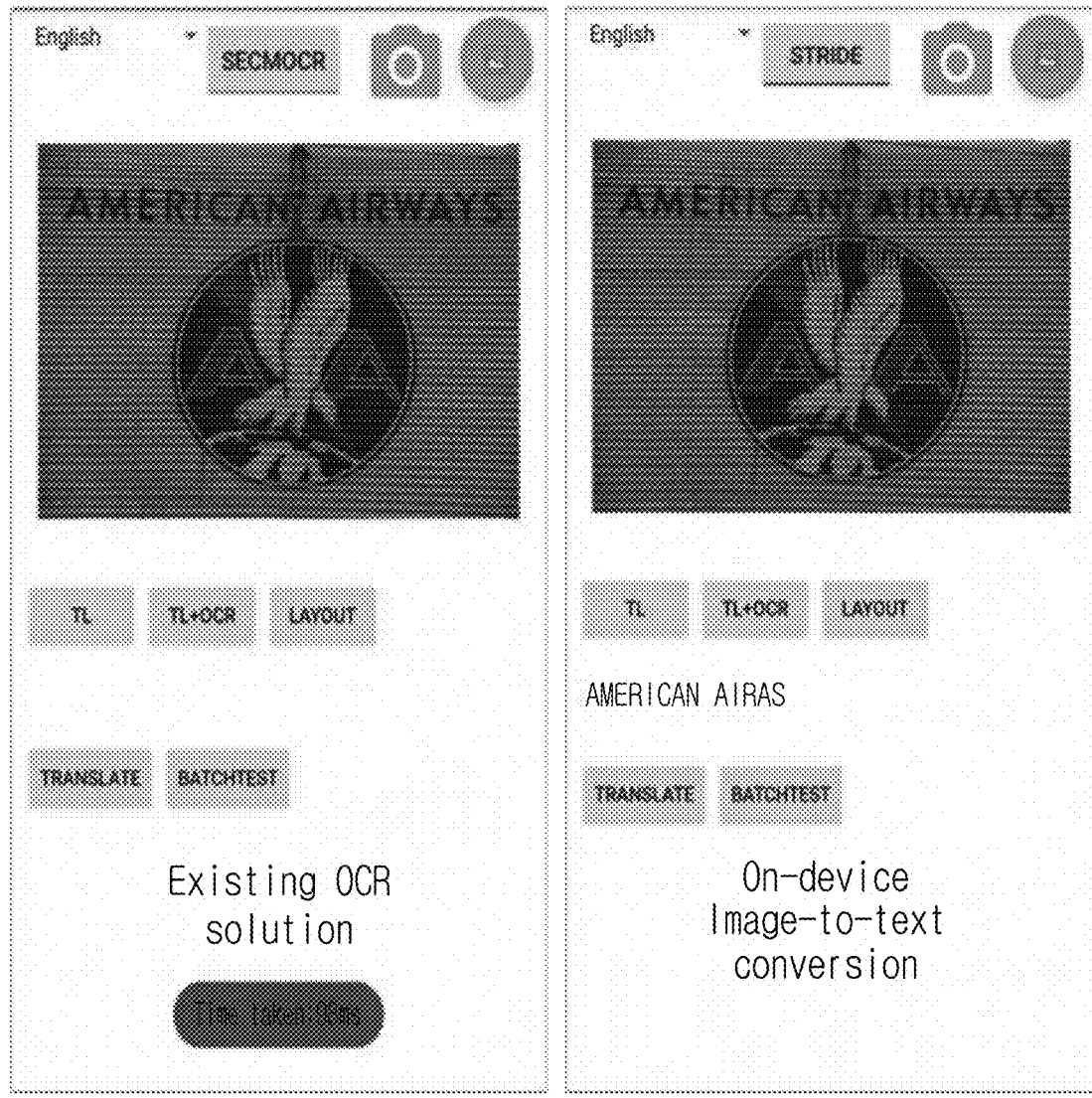

FIG. 32 illustrates the image including a scene text with complex background is converted into text, according to an embodiment of the disclosure.

Figure 33:
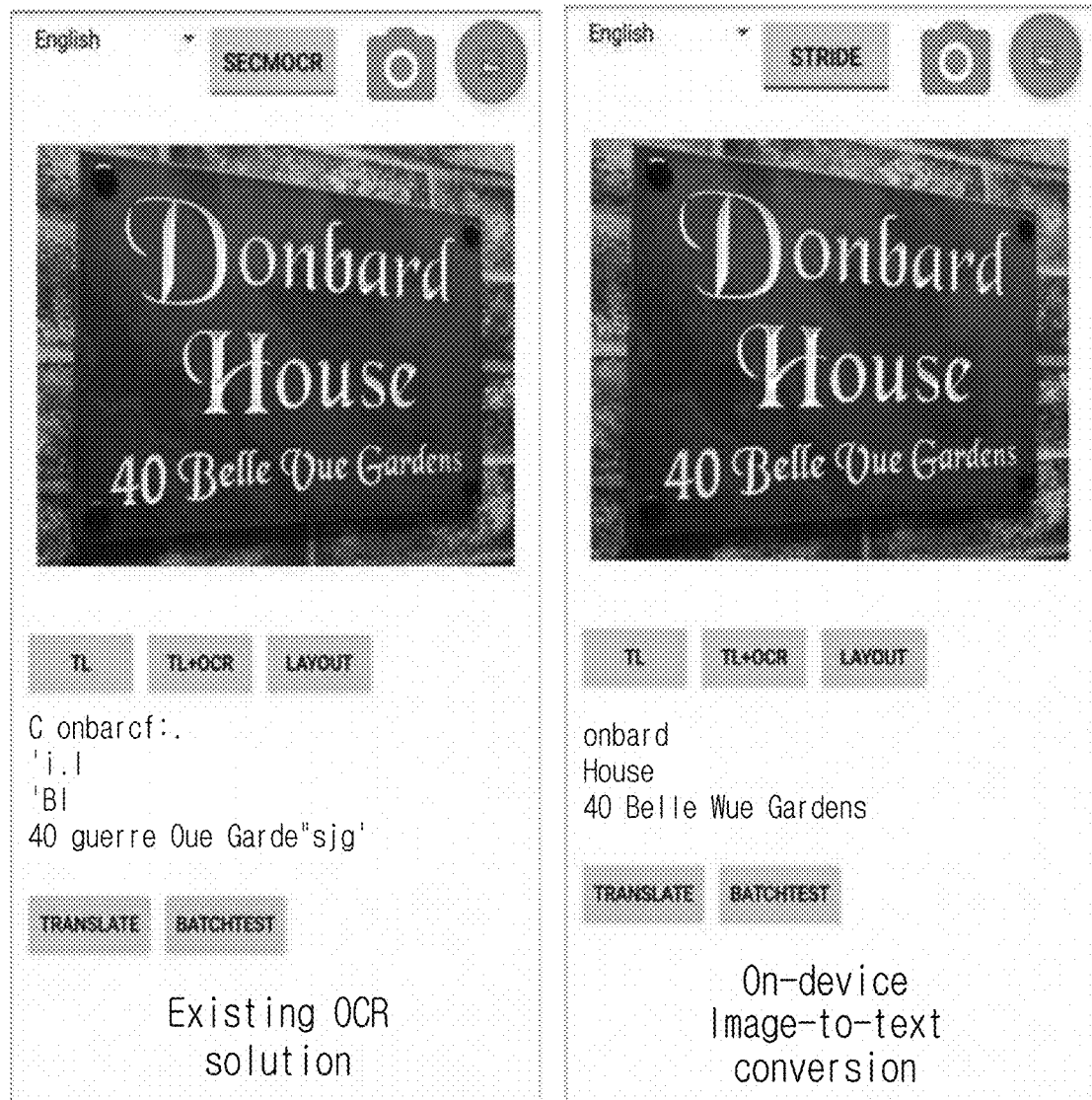

FIG. 33 illustrates the image including a scene text with complex background is converted into text, according to an embodiment of the disclosure.

FIG. 33 illustrates the image including a scene text with complex fonts is converted into text, according to embodiments as disclosed herein.

Figure 34:

FIG. 34 illustrates the camera captured image is converted into text, according to an embodiment of the disclosure.

Figure 35:
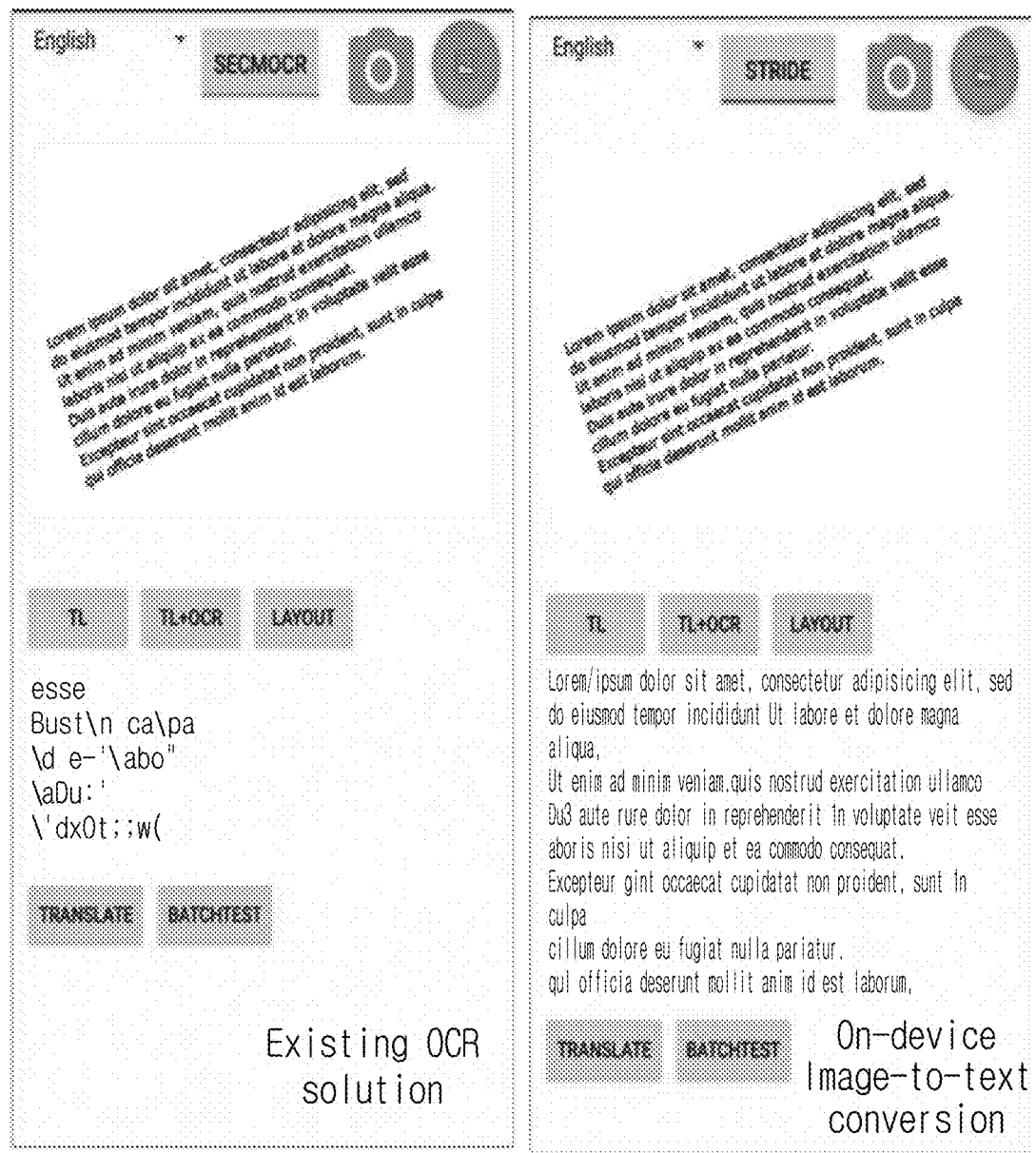

FIG. 35 illustrates the skewed document text is converted into text, according to an embodiment of the disclosure.

Figure 36:
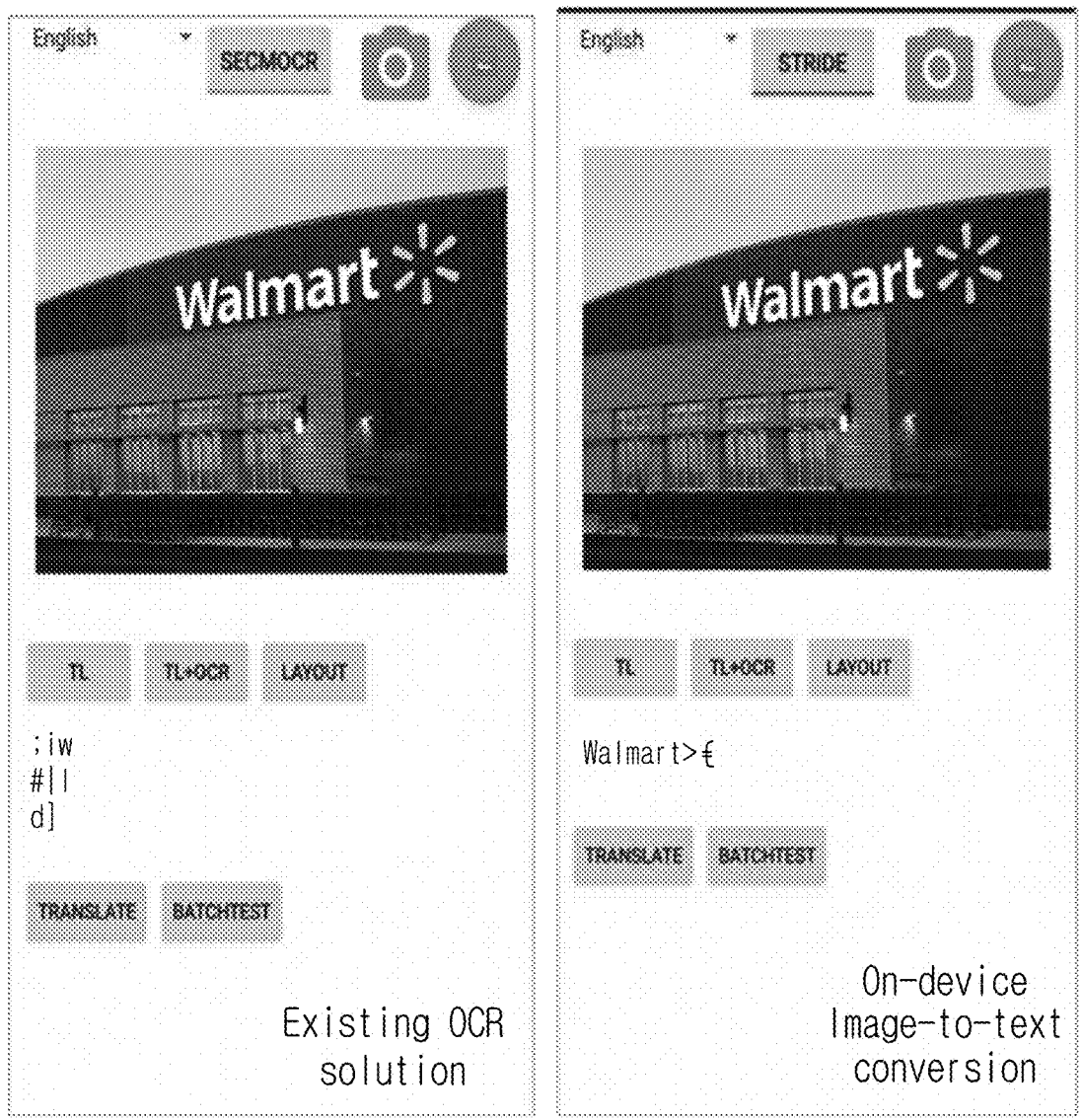

FIG. 36 illustrates the image including a skewed scene text is converted into text, according to an embodiment of the disclosure.

Figure 37:
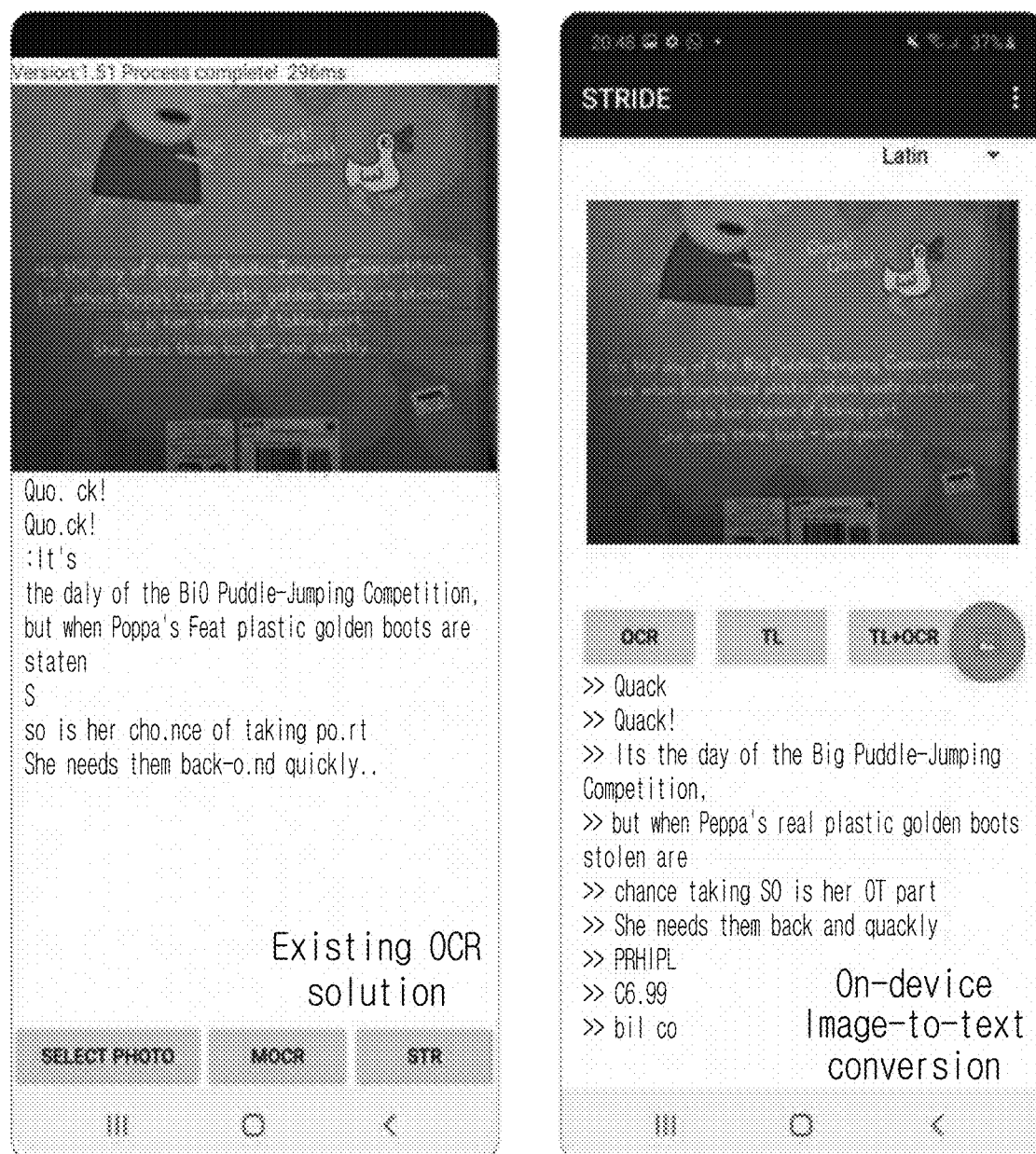

FIG. 37 illustrates the camera captured image is converted into text, according to an embodiment of the disclosure.

Figure 38:
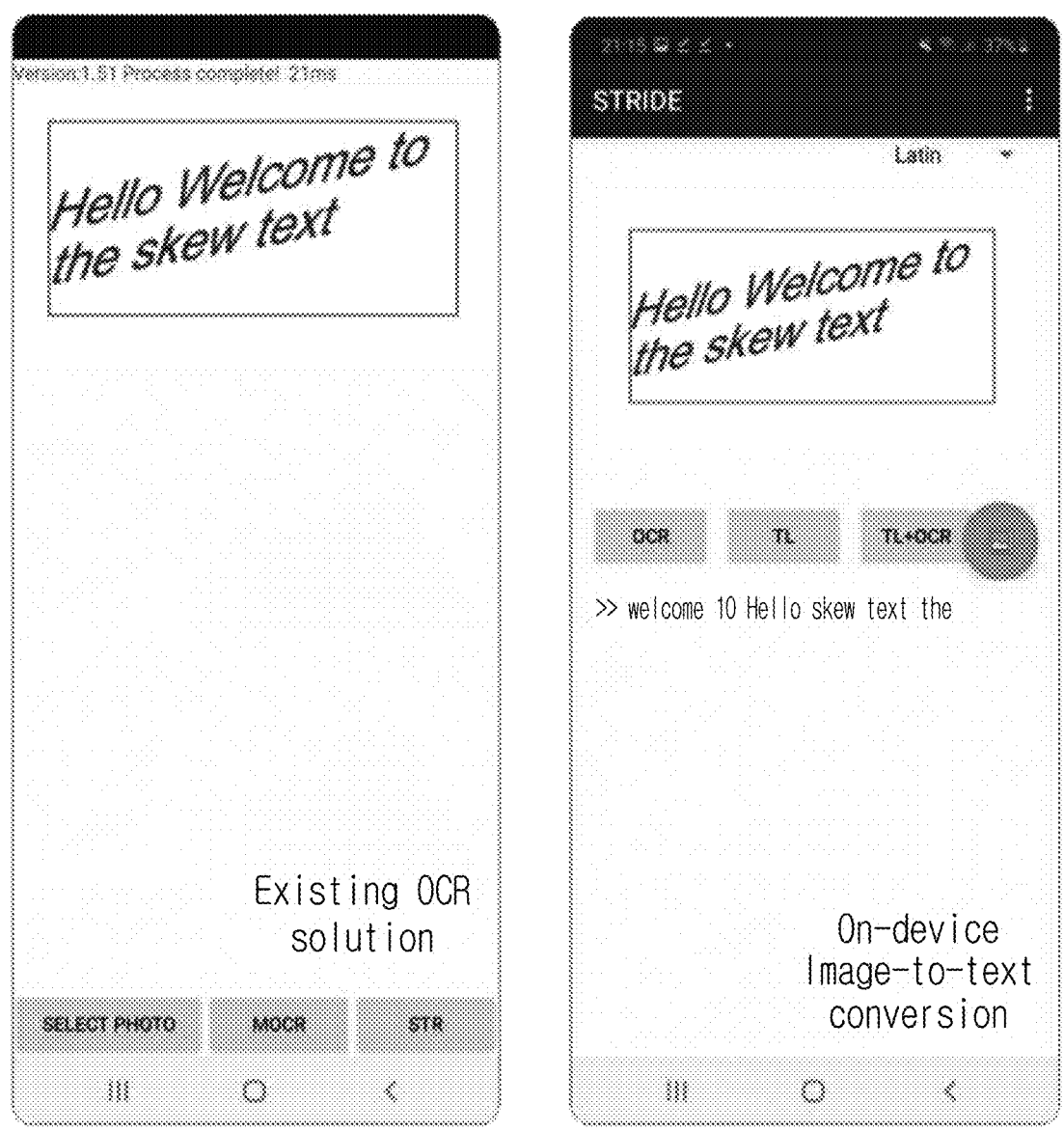

FIG. 38 illustrates the image including a skewed scene text is converted into text, according to an embodiment of the disclosure.

Referring to FIGS. 29-38, various types of images may be converted to text.

Figure 39:
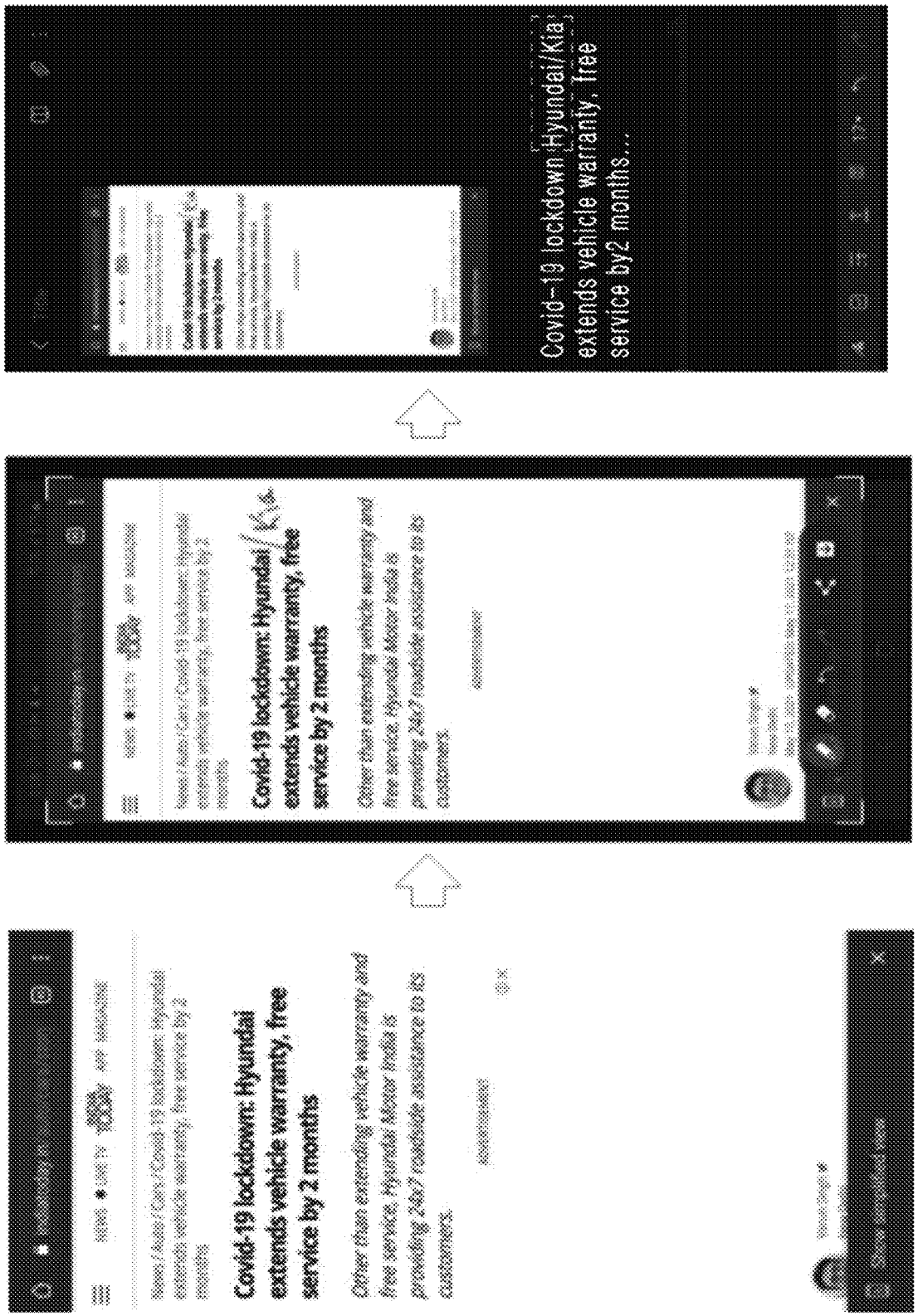
FIG. 39 is an example diagram depicting scenario of converting an annotated image to corrected text, according to an embodiment of the disclosure.

FIG. 39 is an example diagram depicting scenario of converting an annotated image to corrected text, according to an embodiment of the disclosure.

Referring to FIG. 39, the user starts reading something on a website or a PDF, which the user wants to annotate and share. In such a scenario, the electronic device 200 may convert the pdf into the text by applying the annotation in proper text form.

Figure 40:
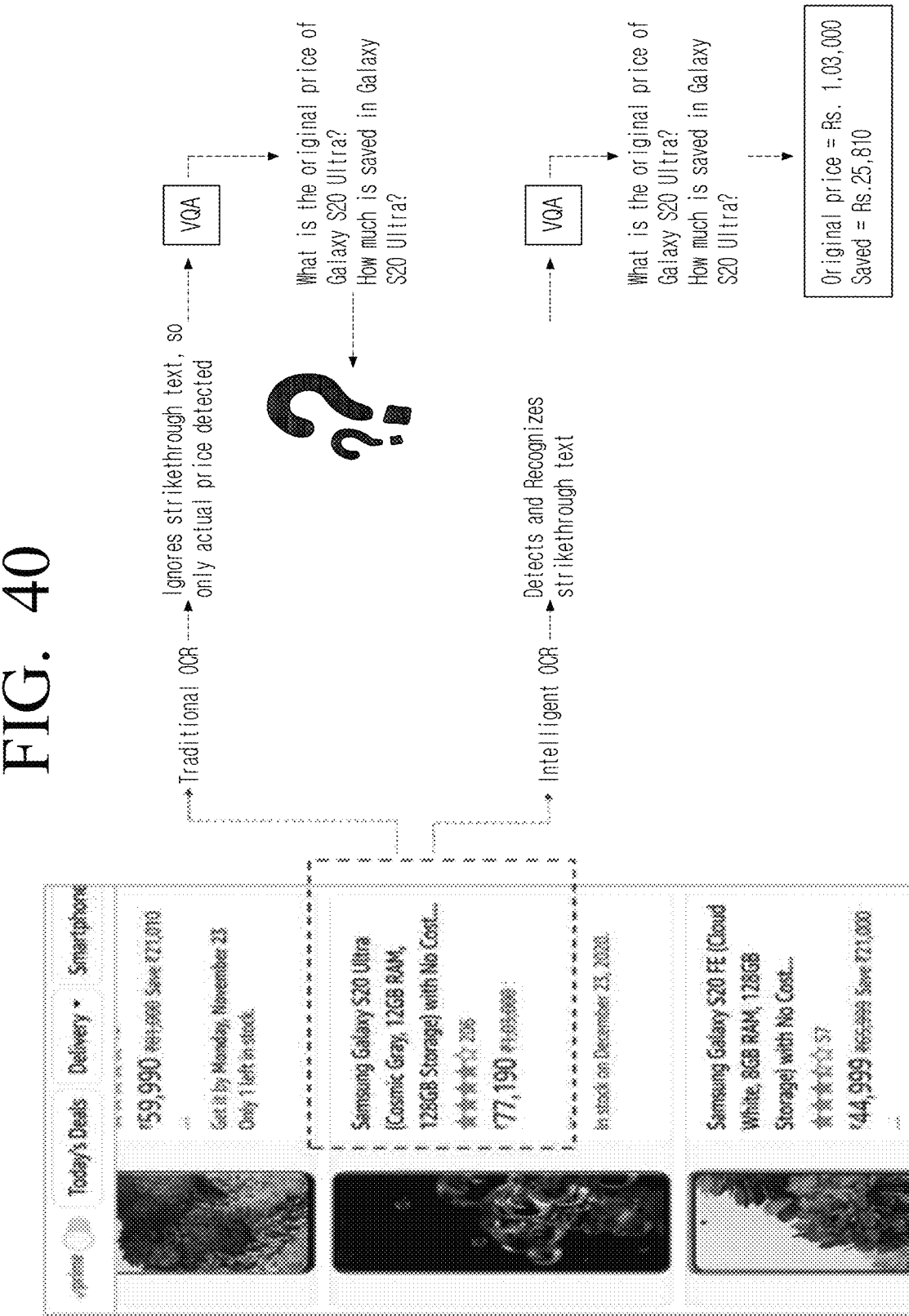
FIG. 40 is an example diagram depicting implementation of an image to text conversion in Natural Language Processing (NLP) based applications, according to an embodiment of the disclosure.

FIG. 40 is an example diagram depicting implementation of an image to text conversion in NLP based applications, according to an embodiment of the disclosure.

Embodiments herein convert the image into the text by recognizing the one or more markers and detecting the language of the text in the image. Thus, the image to text conversion described herein may be implemented in the NLP based applications such as, but are not limited to, Visual Question Answering (VQA), summarization, sentiment analysis, hashtag prediction, and the like.

Referring to FIG. 40, while viewing details related to a smart phone on an e-commerce website page, the user rises a query stating that "What is the original price of Galaxy S20

Ultra? How much is saved in Galaxy S20 Ultra?". In such a scenario, the existing OCR solutions provide only an actual price/original price to the user as reply to the query raised by the user, since the existing OCR solutions ignore the markers such as strikethrough text, or the like. In contrast, embodiments herein enable the electronic device 200 to detect and recognize strikethrough text and accordingly tasks down a pipeline like the VQA, which can make use of the strikethrough text for better understanding of the image/document. Thus, the electronic device 200 provides a reply to the query raised by the user by providing details related to the original price and the saved price, thus enhancing the user experience.

Figure 41:
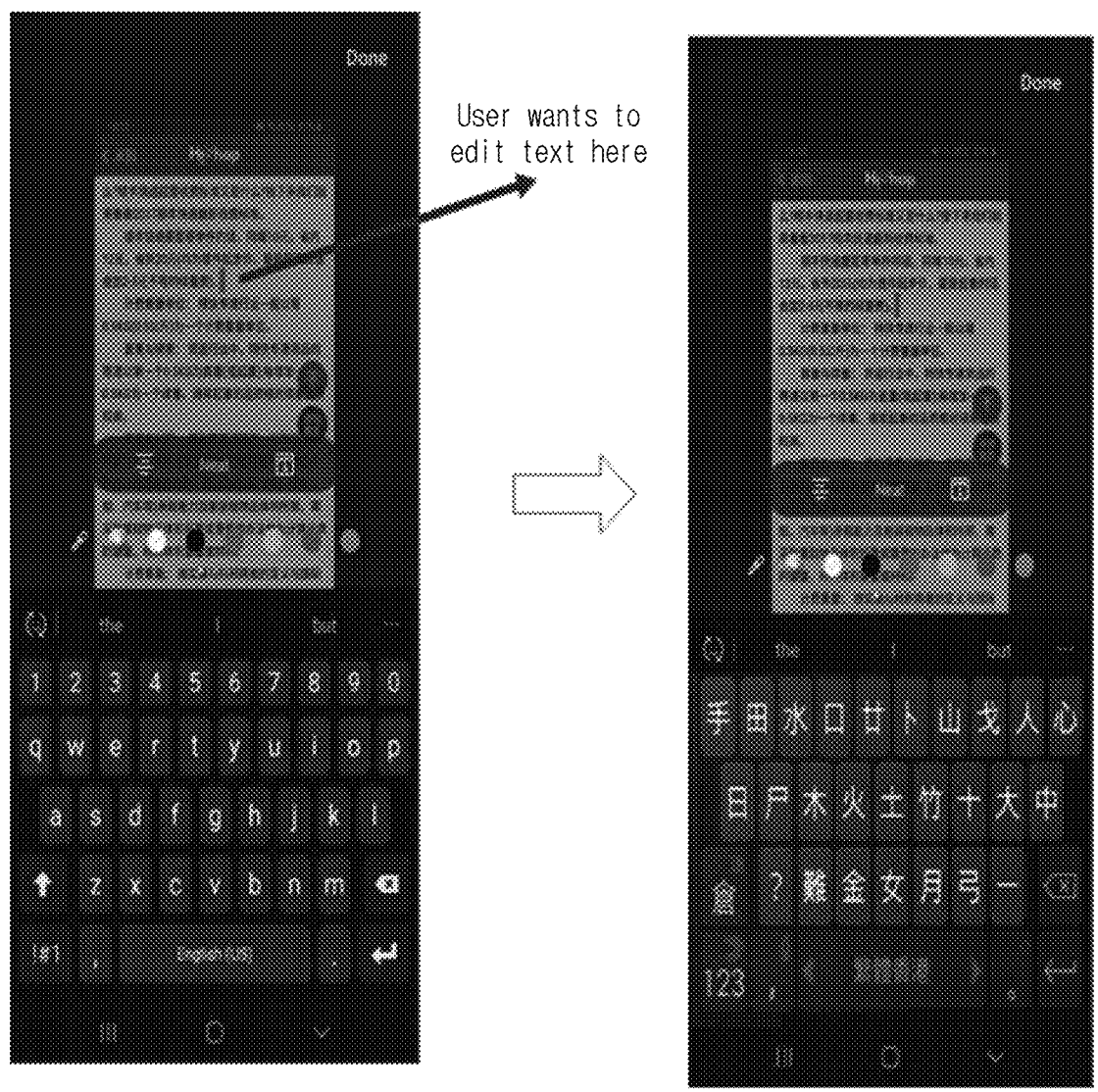
FIG. 41 is an example diagram depicting an edit application based on a detection of a language of text present in an image, according to an embodiment of the disclosure.

FIG. 41 is an example diagram depicting an edit application based on a detection of a language of text present in the image, according to an embodiment of the disclosure.

Referring to FIG. 41, the user opens a photo editor to add some text to the image. On opening the photo editor, a keyboard opens with a default keyset of English, as the user's default language is English. In such a scenario, the electronic device 200 may automatically determine the language of the text present in the image as Korean and opens the keyboard having a keyset of Korean, thereby enhancing user experience.

Figure 42:
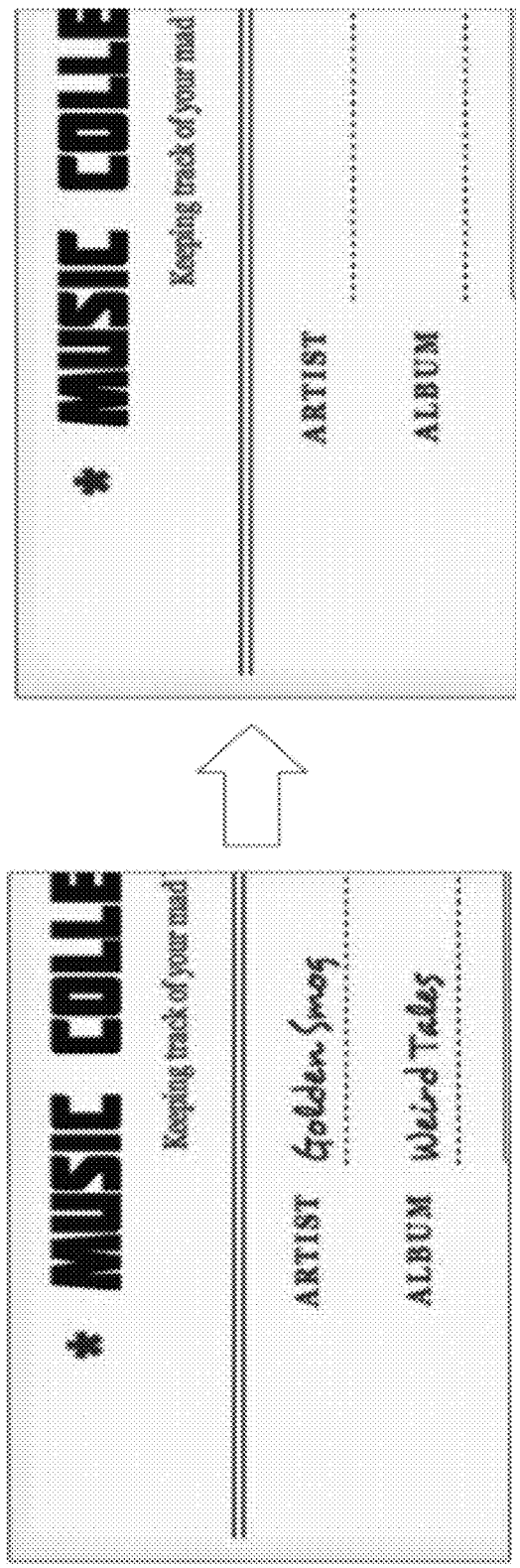
FIG. 42 is an example diagram depicting identification of an edited form and regeneration of an original form from an edited form, according to an embodiment of the disclosure.

FIG. 42 is an example diagram depicting identification of an edited form and regeneration of an original form from the edited form, according to an embodiment of the disclosure.

Referring to FIG. 42, the electronic device 200 may receive the image of the edited from to convert into the original form. In such a scenario, the electronic device 200 may detect the user edited segments/edited features like an underline and accordingly determines regions associated with the underline in the edited form, wherein the determined regions are regions where the user has entered the text. The electronic device 200 may regenerate the original form by removing the text from the determined regions.

Figure 43:
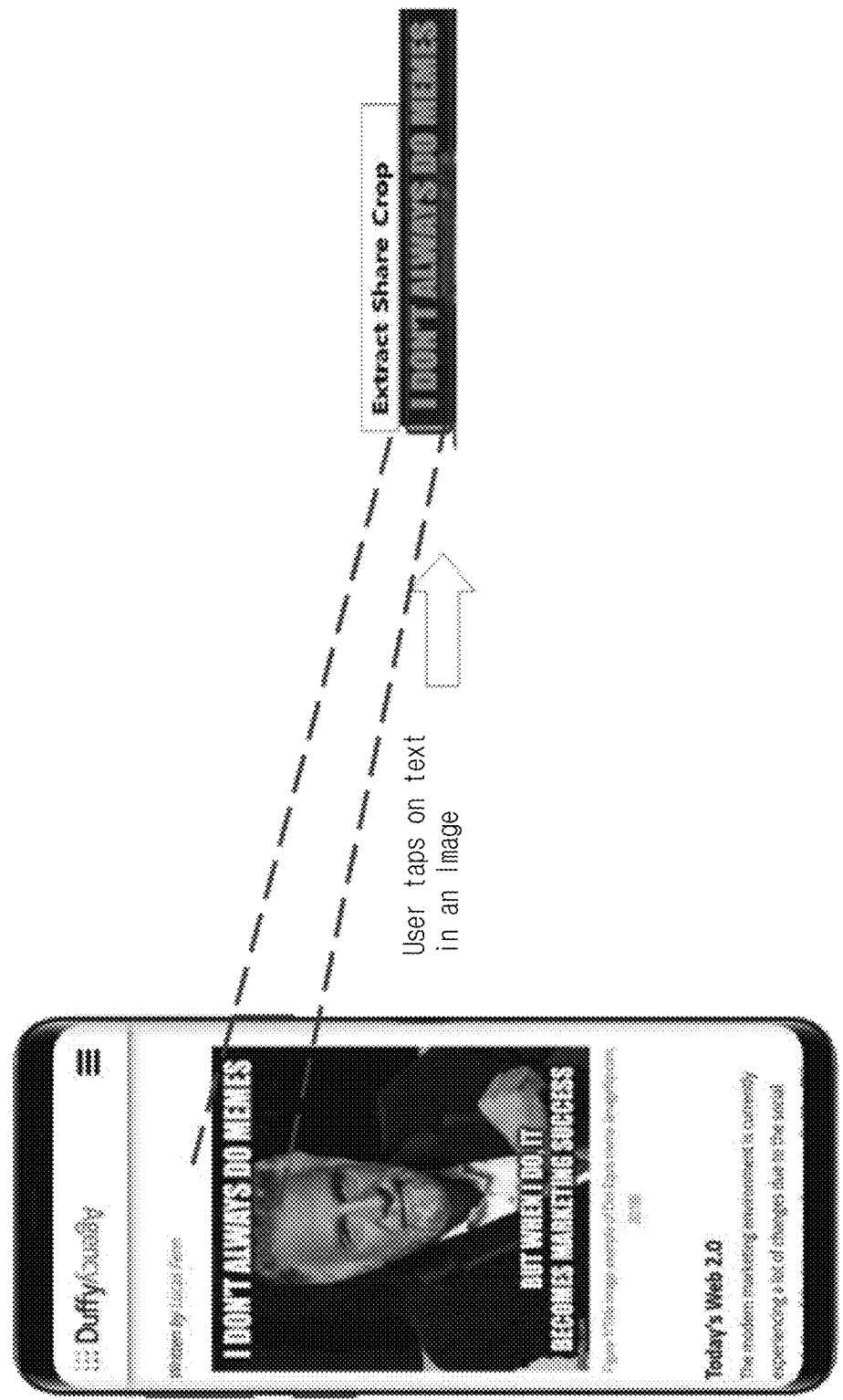
FIG. 43 is an example diagram depicting extraction of text from an image, according to an embodiment of the disclosure.

FIG. 43 is an example diagram depicting extraction of the text from the image, according to an embodiment of the disclosure.

Referring to FIG. 43, the user taps on a text "I DON'T ALWAYS DO MEMES" in the image. In such a scenario, the electronic device 200 determines the language of the text that has been tapped by the user in the image and accordingly extracts the corresponding text from the image by performing the OCR. Thereby, the user may copy or share the extracted text.

Figure 44:
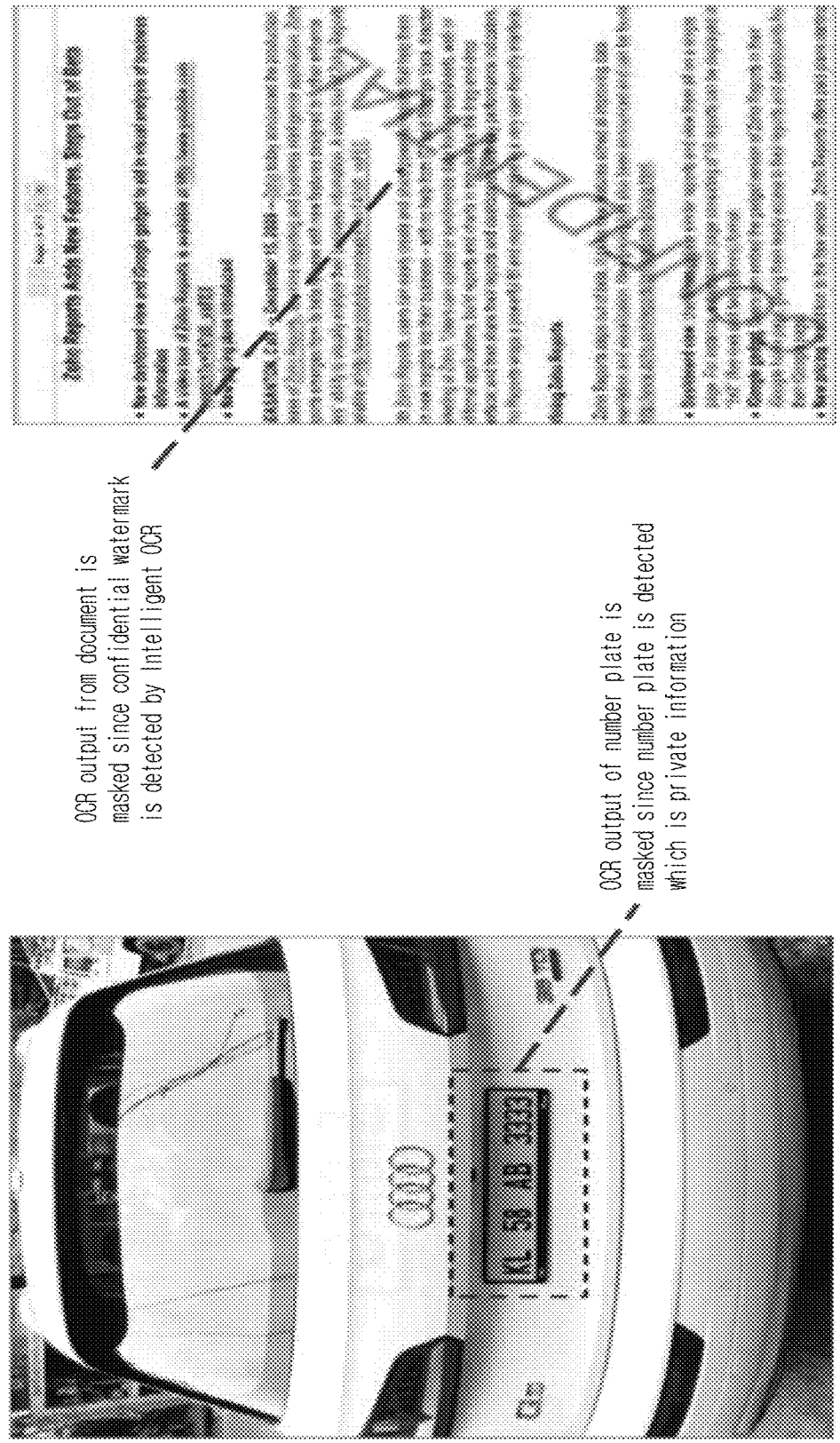
FIG. 44 is an example diagram depicting masking of private feature while performing an image to text conversion, according to an embodiment of the disclosure.

FIG. 44 is an example diagram depicting masking of private feature while performing an image to text conversion, according to an embodiment of the disclosure.

Referring to FIG. 44, the electronic device 200 may detect private features in the image such as, but are not limited to, a number plate, a copyright, a watermarked text, and the like. The electronic device 200 may mask the detected private features in the text converted output from the image.

Figure 45:
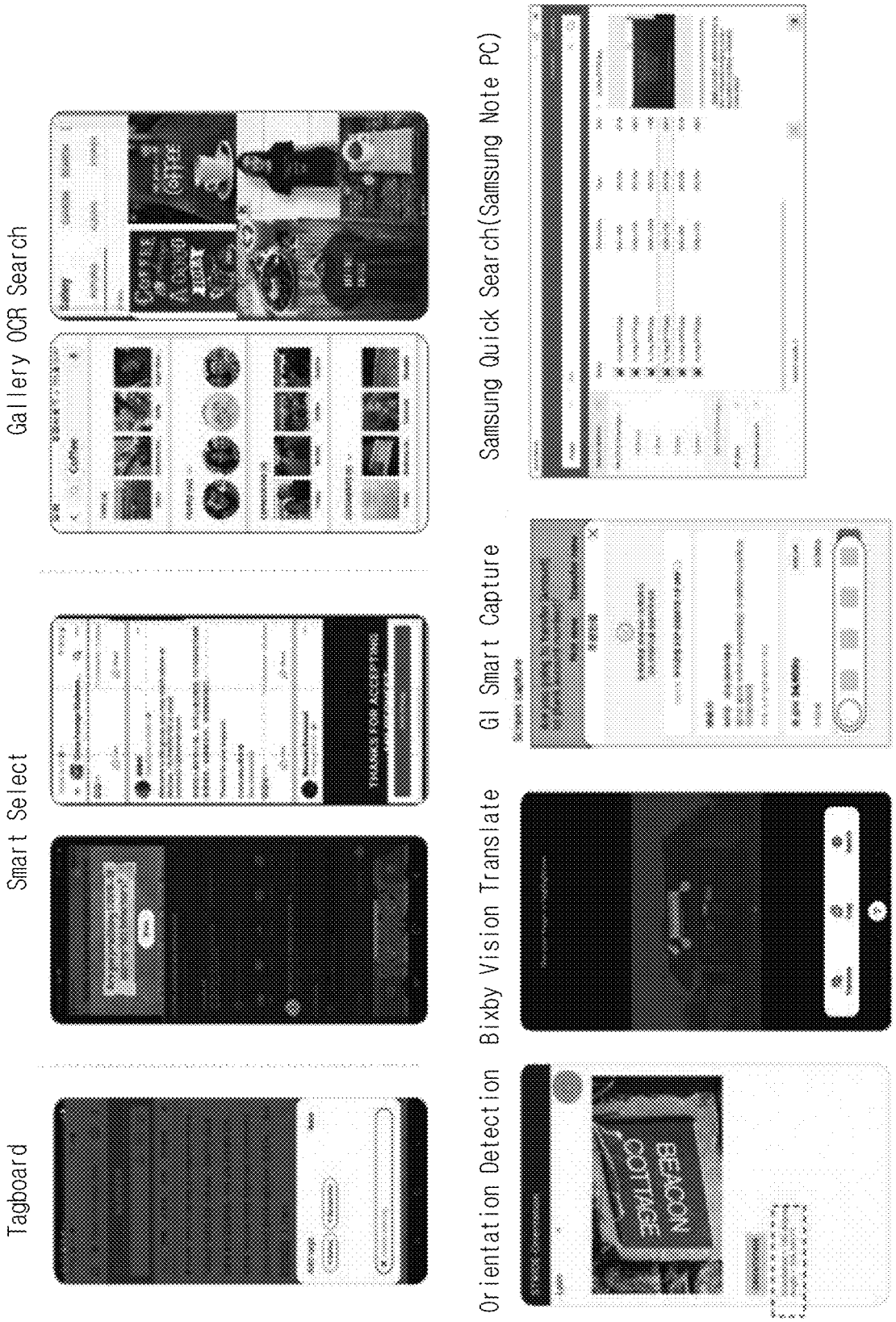
FIG. 45 is an example diagram depicting applications in which an image to text conversion may be used, according to an embodiment of the disclosure.

FIG. 45 is an example diagram depicting applications in which an image to text conversion may be used, according to an embodiment of the disclosure.

Referring to FIG. 45, the image to text conversion described in the above embodiments may be used in applications on the electronic device 200 such as, but are not limited to, a tagboard, a smart select application, a gallery OCR search application, an orientation detection, a vision translate application, a smart capture application to make payments, a quick search application, and the like.

FIG. 46 is a flow chart depicting a method for converting the image into the text, according to an embodiment of the disclosure.

In a method 4600, at operation 4602, the method includes recognizing, by the electronic device 200, the at least one block from at least one image representing content to be converted into the text. At operation 4604, the method includes recognizing, by the electronic device 200, the at least one marker relative to the content to be converted into the text. The at least one marker indicates at least one of, at least one handwritten text, at least one lexicon and associated directional properties, at least one non-text annotation, and at least one user edited text segment.

At operation 4606, the method includes performing, by the electronic device 200, the OCR on the at least one block of the at least one image to create a first set of converted text, based on the recognized at least one marker. At operation 4608, the method includes generating, by the electronic device 200, the text converted output by associating the recognized at least one marker with the first set of converted text using the first neural network 302.

Embodiments herein performing on-device image to text conversion including language detection from an image, understanding of text in an edited image and localized lexicon for post Optical Character Recognition (OCR) correction.

Embodiments herein detect the language of text present in the image automatically and use the detected language as input to the OCR may improve an accuracy of the OCR. The improved accuracy may be identified in case of blurry images having diacritics and other language marks.

Embodiments herein convert the image into the text with the following features:
- automatic on-device OCR
- document orientation recognition;
- annotation recognition;
- visual language detection; and
- localized Lexicon based post OCR correction.

The embodiments disclosed herein can be implemented through at least one software program running on at least one hardware device and performing network management functions to control the elements. The elements shown in FIGS. 2, and 3 can be at least one of a hardware device, or a combination of hardware device and software module.

The embodiments disclosed herein describe methods and systems for performing on-device image to text conversion. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the disclosure may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by an electronic device, the method comprising:
   recognizing, by the electronic device, at least one block from at least one image representing content to be converted into text;
   recognizing, by the electronic device, at least two markers relative to the content to be converted into the text, the recognizing of the at least two markers including:
      recognizing at least one lexicon and associated directional properties as at least one first marker, the lexicon including semantic information or grammatical information about individual words or word strings in the at least one image; and
      recognizing at least one of: at least one handwritten text, at least one non-text annotation, or at least one user edited text segment, as at least one second marker;
   performing, by the electronic device, an optical character recognition (OCR) on the at least one block of the at least one image to create a set of converted text, based on the recognized at least two markers, the performing of the OCR including:
      recognizing at least one printed text in the at least one block of the at least one image; and
      creating the set of converted text by arranging the recognized at least two markers with respect to the recognized at least one printed text; and
   generating, by the electronic device, a text converted output, the text converted output being generated by a first neural network associating the recognized at least two markers with the set of converted text.

2. The method of claim 1, wherein the at least one image comprises at least one of, at least one camera captured image, at least one screenshot, at least one computer generated image, or at least one image shared across social networking sites.

3. The method of claim 1,
   wherein the at least one handwritten text is recognized as the at least one second marker,
   wherein the recognizing, by the electronic device, of the at least two markers comprises:
      recognizing the at least one handwritten text or at least one printed text in the content to be converted into the text based on at least one of, edited symbols, a text/character map, a link/affinity map, an annotation/handwritten map, or a script map,
   wherein the text/character map includes information about a probability of a pixel being a text pixel or not,
   wherein the link/affinity map includes information about a probability of the pixel being between characters of a word,
   wherein the annotation/handwritten map includes information about a probability of the text pixel being handwritten or not, and
   wherein the script map includes information about a probability of the text pixel being associated with a particular language or not.

4. The method of claim 3,
   wherein the edited symbols comprise at least one of an insertion mark, a strikethrough, a highlight, underline, or references.

5. The method of claim 1,
   wherein the at least one non-text annotation is recognized as the at least one second marker, and
   wherein the recognizing, by the electronic device, of the at least two markers comprises:
      training a second neural network to segment the at least one image into a foreground non-text annotation map and a background image;
      thresholding the foreground non-text annotation map; and
      recognizing the at least one non-text annotation and an associated position in the at least one block including the content to be converted into the text by applying a connected component analysis on the thresholded foreground non-text annotation map.

6. The method of claim 1,
   wherein the at least one user edited text segment is recognized as the at least one second marker, and
   wherein the recognizing, by the electronic device, of the at least two markers comprises:
      recognizing the at least one user edited text segment in the at least one block including the content to be converted into the text based on edited symbols.

7. The method of claim 5, further comprising:
   in case that the at least one non-text annotation is recognized as the at least one second marker, cropping the at least one non-text annotation from the at least one block; and
   determining a category of the at least one non-text annotation, the category of the at least one non-text annotation being determined by a third neural network processing the cropped at least one non-text annotation.

8. The method of claim 1, further comprising:
   correcting, by the electronic device, the set of converted text based on visual characteristics of the at least one image, contextual and localized lexicons extracted from the at least one image, annotation of objects present in the at least one image, translated text belonging to other scripts present in the at least one image, and a confidence value of the recognized at least two markers.

9. The method of claim 1,
   wherein the generating, by the electronic device, of the text converted output, in case that the at least one handwritten text is recognized as the at least one second marker, comprises:
      associating the at least one handwritten text with at least one printed text present in the content to be converted into the text based on a position and a proximity of the at least one handwritten text with respect to the corresponding at least one printed text; and preparing a target action based on the position and the proximity of the at least one handwritten text with respect to the corresponding at least one printed text, wherein the text converted output is generated by the first neural network applying the prepared target action on the set of converted text, and wherein the text converted output includes the at least one printed text and the at least one handwritten text.

10. The method of claim 9, wherein the associating of the at least one handwritten text comprises:

segmenting pixels of the at least one block of the at least one image into text and non-text; and detecting the position of the at least one handwritten text by applying a connected component analysis on the segmented pixels.

11. The method of claim 9, wherein the preparing of the target action comprises:

cropping words corresponding to the at least one handwritten text from the at least one block of the at least one image based on the position and the proximity of the at least one handwritten text with respect to the at least one printed text.

12. The method of claim 1, wherein the generating, by the electronic device, of the text converted output, in case that the at least one non-text annotation is recognized as the at least one second marker, comprises:

determining at least one non-text annotation property for the at least one non-text annotation based on an annotation properties table; and preparing an annotation action based on the at least one non-text annotation and the determined at least one non-text annotation property, a position of the at least one non-text annotation with respect to at least one printed text or at least one handwritten text, and a category of the at least one non-text annotation, the annotation action indicating an association of the at least one non-text annotation with the at least one printed text or the at least one handwritten text, and wherein the text converted output is generated by the first neural network applying the annotation action on the set of converted text.

13. The method of claim 12, further comprising:

displaying, by the electronic device, the annotation action, and wherein the text converted output is generated by the first neural network applying the annotation action on the set of converted text in response to an input to apply the annotation action being received.

14. An electronic device comprising:

memory storing one or more computer programs; and one or more processors communicatively coupled to the memory, wherein the one or more computer programs include computer-executable instructions that, when executed by the one or more processors individually or collectively, cause the electronic device to:

recognize at least one block from at least one image representing content to be converted into text, recognize at least two markers relative to the content to be converted into the text, the recognizing of the at least two markers including:

recognizing at least one lexicon and associated directional properties as at least one first marker, the lexicon including semantic information or grammatical information about individual words or word strings in the at least one image, and recognizing at least one of: at least one handwritten text, at least one non-text annotation, or at least one user edited text segment, as at least one second marker, perform an optical character recognition on the at least one block of the at least one image to create a set of converted text, based on the recognized at least two markers, the performing of the OCR including:

recognizing at least one printed text in the at least one block of the at least one image, and creating the set of converted text by arranging the recognized at least two markers with respect to the recognized at least one printed text, and generate a text converted output, the text converted output being generated by a first neural network associating the recognized at least two markers with the set of converted text.

15. One or more non-transitory computer-readable storage media storing one or more computer programs including computer-executable instructions that, when executed by one or more processors of an electronic device individually or collectively, cause the electronic device to perform operations, the operations comprising:

recognizing, by an electronic device, at least one block from at least one image representing content to be converted into text;

recognizing, by the electronic device, at least two markers relative to the content to be converted into the text, the recognizing of the at least two markers including:

recognizing at least one lexicon and associated directional properties as at least one first marker, the lexicon including semantic information or grammatical information about individual words or word strings in the at least one image; and recognizing at least one of: at least one handwritten text, at least one non-text annotation, or at least one user edited text segment, as at least one second marker;

performing, by the electronic device, an optical character recognition (OCR) on the at least one block of the at least one image to create a set of converted text, based on the recognized at least two markers, the performing of the OCR including:

recognizing at least one printed text in the at least one block of the at least one image; and creating the set of converted text by arranging the recognized at least two markers with respect to the recognized at least one printed text; and generating, by the electronic device, a text converted output, the text converted output being generated by a first neural network associating the recognized at least two markers with the set of converted text.

* * * * *